(12) United States Patent
Fukuda et al.

(10) Patent No.: US 7,219,761 B2
(45) Date of Patent: *May 22, 2007

(54) MOTOR-OPERATED POWER STEERING APPARATUS

(75) Inventors: Toshihiro Fukuda, Maebashi (JP); Shuji Endo, Maebashi (JP); Hiroshi Eda, Maebashi (JP); Osamu Tatewaki, Maebashi (JP); Kenichi Hayakawa, Maebashi (JP); Hirotaka Hatano, Atsugi (JP); Mineki Okamoto, Kisarazu (JP)

(73) Assignee: NSK Ltd. (JP)

( * ) Notice: Subject to any disclaimer, the term of this patent is extended or adjusted under 35 U.S.C. 154(b) by 6 days.

This patent is subject to a terminal disclaimer.

(21) Appl. No.: 10/804,836

(22) Filed: Mar. 19, 2004

(65) Prior Publication Data

US 2004/0245041 A1 Dec. 9, 2004

Related U.S. Application Data

(63) Continuation-in-part of application No. 10/088,790, filed as application No. PCT/JP01/06319 on Jul. 23, 2001, now Pat. No. 6,851,508.

(30) Foreign Application Priority Data

Jul. 21, 2000 (JP) ............................. 2000-220404
Jul. 21, 2000 (JP) ............................. 2000-220405
Sep. 19, 2002 (JP) ............................. 2000-272830

(51) Int. Cl.
*B62D 5/04* (2006.01)

(52) U.S. Cl. ...................... 180/444; 180/443

(58) Field of Classification Search ............... 180/444, 180/443, 446; 701/41
See application file for complete search history.

(56) References Cited

U.S. PATENT DOCUMENTS 4,754,829 A 7/1988 Shimizu (Continued)

FOREIGN PATENT DOCUMENTS

DE 692 13 363 T2 1/1993

(Continued)

OTHER PUBLICATIONS

Combined Search and Examination Report dated Sept. 5, 2003 issued in a correspondence Great Britain application relating to U.S. Patent No. 4,773,497 submitted as Ref. A1 above, 4 pgs.

(Continued)

*Primary Examiner*—Tony Winner
(74) *Attorney, Agent, or Firm*—Osha Liang LLP

(57) ABSTRACT

An electrically driven power steering apparatus is structured such that a large impact on a rack shaft occurs upon an impingement of a steering stopper, and, even when an axial force acting on a ball bearing of a presser member becomes zero, a rotation of the presser member is hindered by caulking c at a thin plate member. Therefore, the presser member does not slacken, and a predetermined axial force can be given again to the ball bearing when the impact dissipates. The thus structured power steering apparatus exhibiting, though the cost is low, an excellent shockproof characteristic and capable of preventing the bearing from coming off a ball screw nut, can be provided.

8 Claims, 14 Drawing Sheets

U.S. PATENT DOCUMENTS

| | | | |
|---|---|---|---|
| 4,773,497 A | 9/1988 | Carlson et al. | |
| 4,825,972 A * | 5/1989 | Shimizu | 180/444 |
| 4,837,692 A | 6/1989 | Shimizu | |
| 5,182,711 A | 1/1993 | Takahashi et al. | |
| 5,473,539 A | 12/1995 | Shimizu et al. | |
| 5,590,732 A | 1/1997 | Sugino et al. | |
| 5,602,451 A | 2/1997 | Kohge et al. | |
| 5,719,766 A | 2/1998 | Bolourchi et al. | |
| 5,732,373 A | 3/1998 | Endo | |
| 5,921,344 A * | 7/1999 | Boyer | 180/444 |
| 5,971,094 A | 10/1999 | Joshita | |
| 6,112,846 A | 9/2000 | Mukai et al. | |
| 6,148,948 A | 11/2000 | Shimizu et al. | |
| 6,412,591 B1 | 7/2002 | Endo et al. | |
| 6,425,454 B1 | 7/2002 | Chabaan et al. | |
| 6,445,987 B1 | 9/2002 | Kurishige et al. | |
| 6,450,287 B1 | 9/2002 | Kurishige et al. | |
| 6,459,971 B1 | 10/2002 | Kurishige et al. | |
| 6,527,079 B2 | 3/2003 | Takeuchi et al. | |
| 6,570,352 B2 | 5/2003 | Hara et al. | |
| 6,651,771 B2 | 11/2003 | Chabaan | |
| 6,671,597 B2 | 12/2003 | Kada | |
| 6,678,596 B2 | 1/2004 | Husain et al. | |
| 6,681,165 B2 | 1/2004 | Shibasaki et al. | |
| 6,751,538 B2 | 6/2004 | Endo | |
| 6,751,539 B2 | 6/2004 | Uenuma et al. | |
| 6,763,908 B2 | 7/2004 | Ogawa et al. | |
| 6,768,283 B2 | 7/2004 | Tanaka et al. | |
| 6,782,968 B2 | 8/2004 | Sakugawa | |
| 6,802,226 B2 | 10/2004 | Ono et al. | |
| 6,854,559 B2 | 2/2005 | Kurishige et al. | |
| 6,859,704 B2 | 2/2005 | Aoki et al. | |
| 6,863,150 B1 | 3/2005 | Tanaka et al. | |
| 6,865,461 B2 | 3/2005 | Neef et al. | |
| 6,938,725 B2 | 9/2005 | Fujioka et al. | |
| 6,941,213 B2 | 9/2005 | Yasui et al. | |
| 6,942,057 B2 | 9/2005 | Boloorchi et al. | |
| 6,983,818 B2 | 1/2006 | Fujioka et al. | |
| 2006/0017413 A1 | 1/2006 | Okamoto et al. | |

FOREIGN PATENT DOCUMENTS

| | | |
|---|---|---|
| GB | 2 198 098 A | 6/1988 |
| JP | 56-11136 | 1/1981 |
| JP | 62-118783 | 7/1987 |
| JP | 62-127868 | 8/1987 |
| JP | 1-145670 | 10/1989 |
| JP | 6-144246 | 5/1994 |
| JP | 6-144280 | 5/1994 |
| JP | 6-239247 | 8/1994 |
| JP | 8-207797 | 8/1996 |
| JP | 9-132153 | 5/1997 |
| JP | 10-129509 | 5/1998 |
| JP | 10-281235 | 10/1998 |
| JP | 2000-159128 | 6/2000 |
| JP | 2000-161435 | 6/2000 |
| JP | 2001-97232 | 4/2001 |
| WO | WO 2004026665 A1 | 4/2004 |

OTHER PUBLICATIONS

Partial translation of Japanese Utility Model Application Laid-open No. 62-127868 (Ref. A3 above), 7 sheets.

Partial translation of Japanese Utility Model Application Laid-open No. 56-11136 (Ref. A4 above), 13 sheets.

Partial translation of Japanese Utility Model Application Laid-open No. 63-12471, 13 sheets.

Office Action mailed on April 12, 2005 for Japanese Patent Application Laid-Open No. 10-335218 and English Translation, 6 pages.

Office Action mailed Feb. 9, 2006 for U.S. Appl. No. 10/528,559.

English Translation of Final Office Action from Japanese Patent Office in Japanese Patent Application No. 10-335218, mailed Oct. 7, 2005, 4 pages.

Office Action for Japanese Application No. 10-335218, which is a counterpart of US6412591 (previously disclosed in this case), mailed Oct. 7, 2005, 3 pages.

Office Action issued for German Patent Application No. 199 56 713.1-21 dated Nov. 9, 2005 and English translation thereof, 5 pages.

Japanese Office Action dated Jul. 12, 2005 for Japanese Patent Application Laid-Open No. 10-335218.

* cited by examiner

MOTOR-OPERATED POWER STEERING APPARATUS

CROSS-REFERENCE TO RELATED APPLICATIONS

This application is a Continuation-In-Part application of U.S. patent application Ser. No. 10/088,790, filed on Aug. 12, 2002 now U.S. Pat. No. 6,851,508, which is a national phase application of PCT Application No. PCT/JP01/06319, filed Jul. 23, 2001, which claims priority from Japanese Patent Application No. 2000-220404, filed Jul. 21, 2000, and Japanese Patent Application No. 2000-220405, filed Jul. 21, 2000.

BACKGROUND OF INVENTION

1. Field of the Invention

The present invention relates to a vehicle power steering apparatus using an electric motor.

2. Background Art

One known type of an electrically driven power steering apparatus of a vehicle is that a ball screw nut into which a rack shaft of a rack-and-pinion steering apparatus is inserted, is rotated by an electric motor coaxial with the rack shaft, and a rotational output thereof is converted into a thrust in the longitudinal direction of the rack shaft through a ball screw mechanism.

In this type of electrically driven power steering apparatus, the ball screw nut is so supported as to be rotatable with respect to a housing, which involves the use of bearings. These bearings are disposed at both side ends of the ball screw nut and provided with presser members for preventing the bearings from coming off the ball screw nut.

The presser member is formed with a female thread meshing with a male thread formed on an outer periphery of the ball screw nut. The presser member is thus screwed to the ball screw nut and thus prevents the bearing from coming off.

By the way, for example, in a general type of electrically driven power steering apparatus, a steering wheel, when rotating on, finally comes into contact with a steering stopper with the result that further rotations are hindered. If a driver energetically turns the steering wheel, however, an excessive impingement upon the steering stopper might occur. In such a case, an impact as strong as approximately 98.1 kN (10 tons) at the maximum might occur on the rack shaft.

Such a strong impact, when occurred, might exceed an initial axial force of the presser member for preventing the bearing from coming off the ball screw nut, and, when traveling oscillations are added, the presser member might slacken.

If the presser member is screwed to the ball screw nut with a strong toque in order to increase the initial axial force for preventing the presser member from slackening, a ball rolling path formed in the ball screw nut might deform large enough to cause a decline of function of the ball screw nut.

On the other hand, there arises a problem of figuring out what mode a backlash of balls in the rolling path formed between the ball screw nut and the ball screw shaft should be adjusted.

Further, the electrically driven power steering apparatus using the electric motor has been used in terms of saving a fuel cost over the recent years. In the electrically driven power steering apparatus, the electric motor supplied with the electric power from a battery supplies an assistive steering force, and therefore the power may not be taken out of an internal combustion engine directly. Hence, the fuel cost can be saved.

By the way, for instance, in the rack-and-pinion type electrically driven power steering apparatus, if a traveling wheel collides with a paved step of sidewalk during traveling of the vehicle, a large impact might be transferred to the rack shaft from tie rods. Such an impact is transferred tracing back a steering force transfer route and might exert a strong stress on the respective members. While on the other hand, a sufficient rigidity against such an impact is ensured, a problem is that the respective members increase both in sizes and weights.

SUMMARY OF INVENTION

One or more embodiments of the present invention may provide an electrically driven power steering apparatus exhibiting, though the cost is low, an excellent shockproof characteristic and capable of preventing a bearing from coming off a ball screw nut.

One or more embodiments of the present invention may provide an electrically driven power steering apparatus capable of reliving an impact.

An electrically driven power steering apparatus according to the present invention comprises a housing, a ball screw shaft extending within the housing and connected to a steering mechanism, an input shaft to which a steering force is inputted, an output shaft for receiving the steering force from the input shaft and outputting the steering force to the ball screw shaft, a torque sensor for detecting a torque transferred between the input shaft and the output shaft, a motor including a rotor, and a ball screw nut for giving a force in an axial direction to the ball screw shaft by receiving a rotational force from the motor, wherein an elastic member deforming and thus capable of absorbing an impact inputted from the side of the ball screw shaft, is disposed on a power transmission route between the ball screw shaft and the rotor of the motor. Such an impact can be relieved without bringing about increases both in sizes and weights of the respective members.

Further, in a case where the ball screw shaft is integral with the rack shaft, a load occurred on the traveling wheel in a way that depends on a condition of the surface of the traveling road, is transferred to the rack shaft, and consequently the rack shaft, i.e., the ball screw shaft might displace corresponding to this load in the axial direction. If the elastic member is not provided, however, such a displacement is hindered by a friction and an inertia of the motor. According to the present invention, however, the elastic member deforms, whereby the rack shaft can displace in the axial direction without being affected by the friction and inertia. As a result, the displacement is transferred to the rack shaft, a pinion, a steering shaft and a steering wheel, whereby the driver can be precisely informed of so-called road information such as the load occurred on the tire depending on the condition of the road surface, fluctuations thereof and so on.

Further, it is that the elastic member is disposed between the ball screw nut and the rotor of the motor, and the impact inputted from the side of the ball screw shaft is absorbed by a torsional damper effect.

Moreover, a displacement limiter for limiting a predetermined or larger quantity of deformation of the elastic member is provided and constructed of a recessed portion formed in one of the rotor of the motor and the ball screw nut and a protruded portion formed on the other, and the protruded portion, when the elastic member deforms by the predetermined quantity, engages with the recessed portion. With this contrivance, an excessive deformation of the elastic member is restrained, and a damage to this elastic member can be prevented.

An electrically driven power steering apparatus according to the present invention comprises a housing, a ball screw shaft extending within the housing and connected to a steering mechanism, an input shaft to which a steering force is inputted, an output shaft for receiving the steering force from the input shaft and outputting the steering force to the ball screw shaft, a torque sensor for detecting a torque transferred between the input shaft and the output shaft, a motor including a rotor, and a ball screw nut for giving a force acting in an axial direction to the ball screw shaft by receiving a rotational force from the motor, wherein an elastic member deforming and thus capable of absorbing an impact inputted from the side of the ball screw shaft, is disposed on a support portion of the ball screw nut. Such an impact can be relieved without bringing about the increases both in sizes and weights of the respective members.

Furthermore, it is preferable that the elastic member is disposed between the housing and a bearing for supporting the ball screw nut so as to be rotatable with respect to the housing or between the bearing and the ball screw nut.

The bearing and the housing relatively move in the axial direction corresponding to the axis-directional deformation of the elastic member, and there is provided a displacement limiter for limiting a predetermined or larger quantity of deformation of the elastic member by limiting the relative movements of the bearing and the housing in the axial direction. With this contrivance, an excessive deformation of the elastic member is restrained, and a damage to this elastic member can be prevented.

The rotor of the motor and the ball screw nut are connected by an engagement between a female spline and a male spline of which at least one toothed surface is coated with a resin. If the impact is transferred, an emission of butting noises can be effectively restrained.

It is preferable that the displacement limiter limits the predetermined or larger quantity of deformation of the elastic member at 40% or smaller of a maximum steering force exhibited by the motor.

It is also preferable that a natural oscillation frequency of a system constructed of the rotor, the ball screw nut and the elastic member is set to 7 Hz or higher.

An electrically driven power steering apparatus according to the present invention comprises a housing, a ball screw shaft extending within the housing and connected to a steering mechanism, a motor having a rotor, a ball screw nut, connected to the rotor of the motor, for converting a rotational force of the rotor into a force acting in an axial direction and transferring the same force to the ball screw shaft, a bearing for supporting the ball screw nut to as to be rotatable with respect to the housing, and a presser member, screwed to the ball screw nut, for thus pressing the bearing against the ball screw nut, wherein the presser member includes a connection member for connecting the presser member to the ball screw nut so that the presser member and the ball screw nut are unable to relatively rotate. If a large impact on the ball screw shaft occurs upon an impingement of a steering stopper, and even when an axial force acting on the ball bearing of the presser member becomes zero, a rotation of the presser member is hindered. Therefore, the presser member does not slacken, and a predetermined axial force can be given again to the bearing when the impact dissipates.

Further, it is preferable that the connection member connects the presser member to the ball screw nut so as to be unable to relatively rotate by use of a shearing force of a resinous material.

Moreover, it is preferable that the connection member connects the presser member to the ball screw nut so as to be unable to relatively rotate by use of a frictional force.

The presser member is screwed to the ball screw nut and thus adjusts a backlash of the balls within the ball screw nut. Hence, there is no necessity of providing a backlash removing means separately, and the electrically driven power steering apparatus can be provided at a low cost.

Other aspects and advantages of the invention will be apparent from the following description and the appended claims.

DETAILED DESCRIPTION

Figure 1:
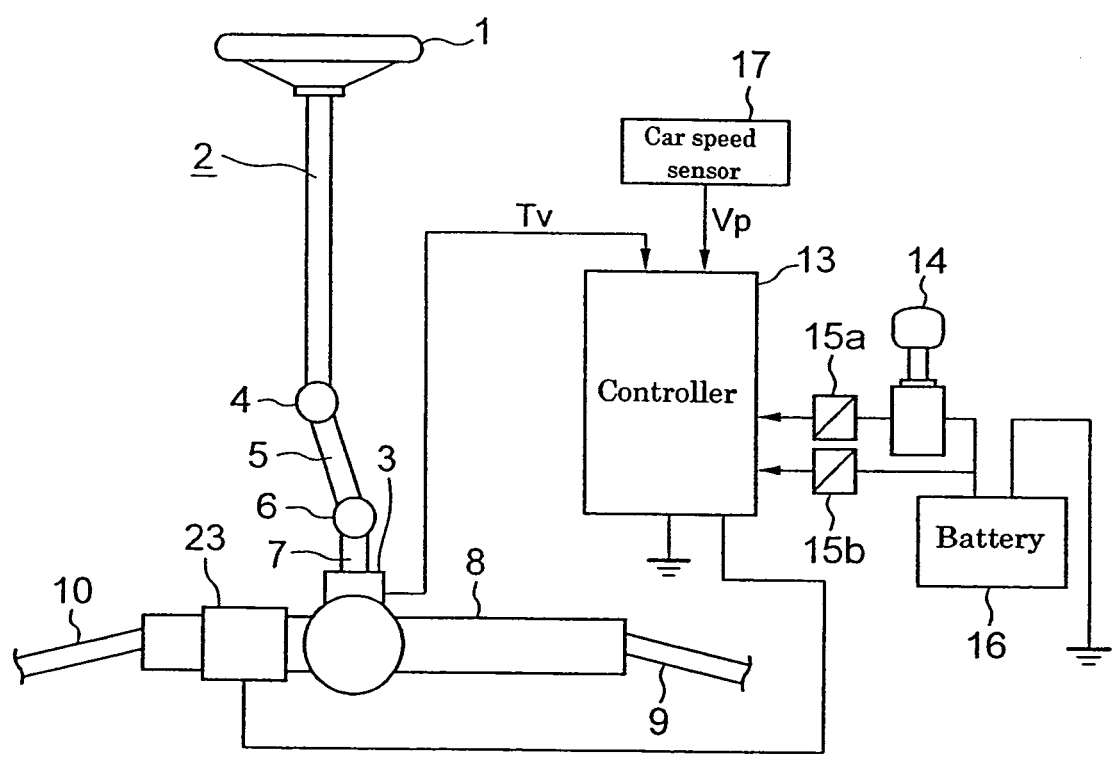
FIG. 1 is a schematic view showing a configuration of an electrically driven power steering apparatus in a first embodiment.

A first embodiment of the invention of the present application will hereinafter be described in depth with reference to the drawings. FIG. 1 is a schematic diagram showing an electrically driven power steering apparatus in the embodiment of the present invention. Referring to FIG. 1, a steering wheel 1 is connected to an upper side end of a steering shaft 2.

A lower side end of the steering shaft 2 is connected via a universal joint 4 to an upper side end of a lower shaft 5, and further a lower side end of the lower shaft 5 is connected via a universal joint 6 to an upper side end of a pinion shaft 7. An unillustrated pinion is connected to a lower side end of the pinion shaft 7 and meshes with rack teeth of a ball screw shaft, i.e., a rack shaft 22 (FIG. 22). A rack shaft coaxial type 5-phase rectangular wave driving type brushless motor 23 is disposed in a mode that will be explained later on in a rack housing 8 through which the rack shaft 22 is inserted.

A torque sensor 3 is disposed in the vicinity of the pinion shaft 7 and detects a steering torque transferred to the pinion shaft 7. The torque sensor 3 is structured to converts it into, for example, a displacement of torsion angle of a torsion bar (not shown) interposed between two-divided pinion shafts 7 and to magnetically mechanically detect this displacement of torsion angle. Accordingly, the torque sensor 3, when an operator steers the steering wheel 1, outputs, to a controller 13, torque detection signals Tv consisting of analog voltages corresponding to a magnitude of steering force and a steering direction.

Namely, the torque sensor 3, for instance, when the steering is in a neutral state, outputs a predetermined neutral voltage as the torque detection signal Tv. The torque sensor 3, if the steering wheel 1 is turned rightwards from this neutral state, outputs a voltage larger corresponding to a steering torque at this time than the neutral voltage, and, if the steering wheel 1 is turned leftwards, outputs a voltage smaller corresponding to a steering torque at this time than the neutral voltage.

The controller 13 is provided for controlling a drive of the motor 23 and controlling a steering assistive force for a steering system. The controller 13 is supplied with the power from a battery 16 mounted in a car and is thereby operated. A negative pole of the battery 16 is grounded, and its positive pole is connected to the controller 13 via an ignition switch 14 for starting an engine and a fuse 15a and directly connected to the controller 13 via a fuse 15b. The power supplied via this fuse 15b is used for backing up a memory. The controller 13 is capable of drive-controlling the brushless motor 23 on the basis of the torque detection signals Tv transmitted from the torque sensor 3 and, for example, car speed detection signal Vp transmitted from a car speed sensor 17 disposed on an output shaft of an unillustrated transmission.

Figure 2:
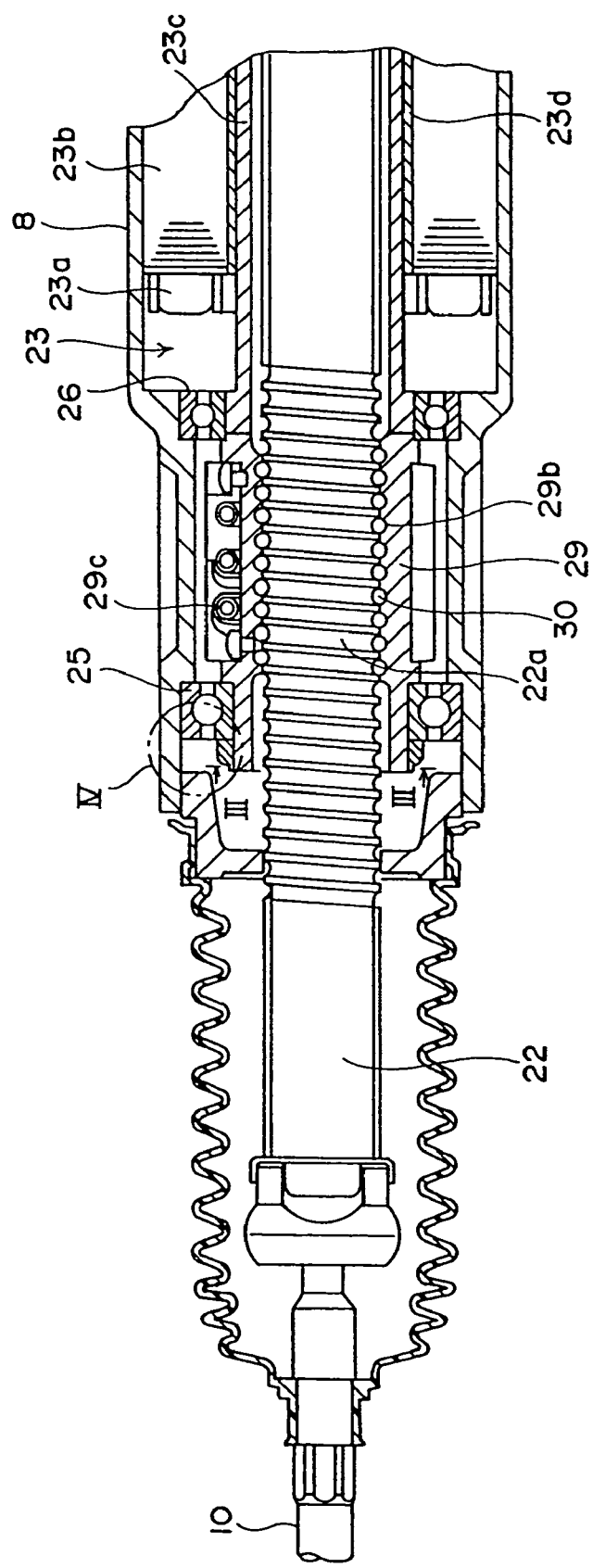
FIG. 2 is a sectional view taken in an axial direction, showing the periphery of a rack shaft coaxial type brushless motor in this embodiment.

FIG. 2 is a sectional view taken in an axial direction, showing the periphery of the rack shaft coaxial type brushless motor in the first embodiment. The housing, i.e., the rack housing 8 is fixed to an unillustrated car body through a bracket 21. The rack shaft 22 is inserted through within the rack housing 8 and connected at its two side ends to tie rods 9 (FIG. 1), 10. The tie rods 9, 10 are connected to an unillustrated steering mechanism.

A stator 23b taking a shape of circular tube is fixed within the rack housing 8, and a coil 23a constructed of a plurality of segments wound on a part of the stator 23b, is also provided therein. A rotor 23c taking a shape of long and thin circular tube is so provided as to insert into the stator 23b. A cylindrical magnet 23d for driving is provided facing to the stator 23a on an outer periphery of the rotor 23c. The drive magnet 23d is magnetized to for forming N- and S-poles alternately in the circumferential direction. The rack shaft 22 extends within the rotor 23c. Note that the stator 23b, the coil 23a, the rotor 23c and the drive magnet 23d constitute the brushless type electric motor 23.

The rotor 23c is so supported as to be rotatable along within the rack housing 8 by a ball bearing and an unillustrated bearing. Note that a rotor for detecting a phase is, though not illustrated, attached to the outer periphery of the rotor 23c. This phase detection rotor detects a polarity of the drive magnet 23d and is therefore disposed to have a given correlation with the polarity. This polarity phase is detected by a resolver R (FIG. 6) disposed adjacently to a position detecting magnet, and an electric signal indicating this polarity phase is outputted to the controller 13.

The controller 13 supplies and distributes the electric current sequentially to the segments of the respective coils 23a divided in the rotational direction, and as a result the brushless motor 23 is drive-controlled to generate a predetermined rotational output.

A left side end of the rotor 23c is connected to a right side end of a ball screw nut 29 taking substantially a circular tube-like shape. The ball screw nut 29 has an internal helical screw groove 29b formed inside, and the internal screw groove 29b forms a rolling path facing to an external screw groove 22a formed in a left side portion of the rack shaft 22, wherein a plurality of balls 30 are accommodated in the rolling path.

The balls are used for reducing a frictional force generated when the ball screw nut 29 and the rack shaft 22 relatively rotate. Note that the ball screw nut 29 has a circulation path 29c, wherein the balls 30 can be circulated through the circulation path 29c when the ball screw nut 29 rotates.

A left side end of the ball screw nut 29 is so supported by an angular contact type ball bearing 25 as to be rotatable along within the housing 8.

Figure 3:
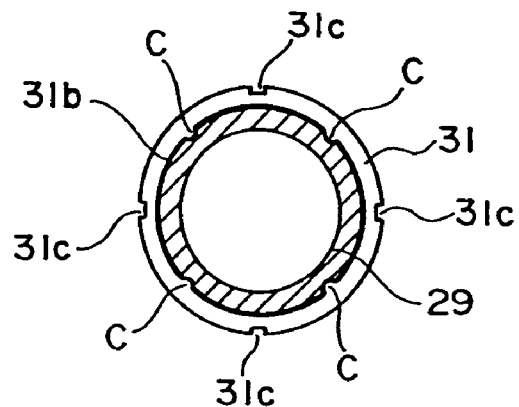
FIG. 3 is a view showing the configuration in FIG. 2, cut off by the line III-III as viewed in the arrow direction.
Figure 4:
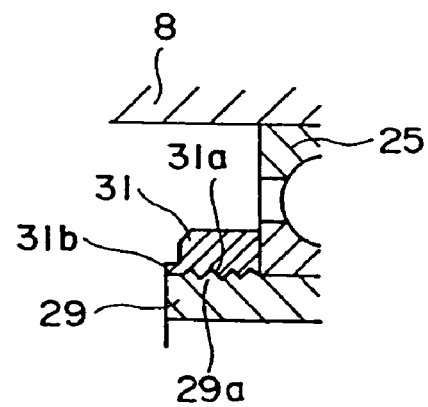
FIG. 4 is an enlarged view of a IV portion of the configuration in FIG. 2.

FIG. 3 is a view showing the configuration in FIG. 2, cut off by the line III-III as viewed in the arrow direction. FIG. 4 is an enlarged view of an IV portion of the configuration in FIG. 2. As illustrated in FIG. 4, a male thread 29a is formed on the outer periphery of the left side end of the ball screw nut 29. A right side end of a cylindrical presser member 31 formed with a female thread 31a meshing with the male thread 29a, is brought into contact with an inner ring of the bearing 25.

A distal end (a left side end in FIG. 4) of the presser member 31 is formed with a thin cylindrical portion 31b extending outward in the axial direction. Note that the outer periphery of the presser member 31 has, as shown in FIG. 3, four notches 31c formed at an equal interval in the peripheral direction. The notches 31c are used for rotating the presser member 31 in a way that engages with a till (not shown).

Next, an operation in this embodiment will be explained with reference to the drawings. Referring to FIG. 1, supposing that the vehicle travels straight and the steering force is not yet inputted to the rack shaft 22 from the steering wheel 1, the torque detection signal Tv outputted from the torque sensor 3 is zero or a low value, and hence the controller 13 does not perform the rotational control of the brushless motor 23. Accordingly, the present electrically driven power steering apparatus is in a state of not outputting the assistive steering force.

On the other hand, when the vehicle turns a curve, the steering wheel 1 is steered, and the steering force is transferred to the rack shaft 22. Therefore, the torque sensor 3 outputs the torque detecting signal Tv corresponding to a steering torque, and the controller 13 rotates the rotor 23c of the brushless motor 23 with a proper torque in a way that takes a detection signal Vp transmitted from the speed sensor 17 into consideration. When the rotor 23c rotates, the ball screw nut 29 also rotates with the result that the rack shaft 22 moves in the left or right direction, thereby generating the assistive steering force.

By the way, the presser member 31 is screwed to the ball screw nut 29 in order to prevent the ball bearing 25 from coming off the ball screw nut 29. If the presser member 31 is fastened with a strong torque for increasing an initial axial force in order to prevent a slack of the presser member 31, however, it follows that the circulation path 29c formed within the ball screw nut 29 deforms. This might cause a decline of function of the ball screw nut 29.

A contrivance to obviate this problem is, according to this embodiment, that the presser member 31 is screwed to the ball screw nut with a toque small enough not to cause the deformation of the circular path 29c, and thereafter the thin cylindrical portion 31b of the presser member 31 is caulked (C) in the radial direction and made to deform so as to be pressed strong against the male thread 29a of the ball screw nut 29. The presser member 31 is thereby so connected as to be impossible to a relative rotation with respect to the ball screw nut 29, and does not slacken even when the strong force is transferred from the rack shaft 22. In this embodiment, the caulking (C) configures a hindering means.

On the other hand, according to this embodiment, a backlash of the ball 30 within the rolling path in the ball screw nut 29 is easily adjusted. For instance, after incorporating the ball bearing 25 into the ball screw nut 29, the presser member 31 is screwed to the side end of the ball screw nut 29, and the presser member 31 is rotated by an unillustrated tool till a proper pre-load is given.

When the proper pre-load is given, the thin cylindrical portion 31b of the presser member 31 is caulked (C) in the radial direction. The presser member 31 is thereby so connected as to be impossible of the relative rotation with respect to the ball screw nut 29, whereby the ball 30 with the backlash can be stably retained within the ball screw nut 29.

Figure 5:
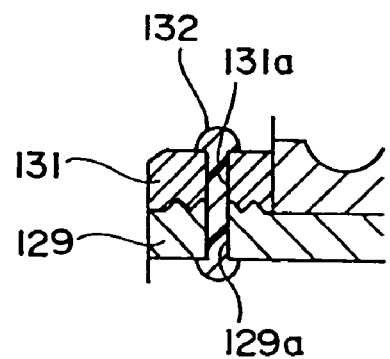
FIG. 5 is a sectional view of a side end of a ball screw nut, showing a modified example of this embodiment.

FIG. 5 is a sectional view of the side end of the ball screw nut, showing a modified example of this embodiment. Referring to FIG. 5, a presser member 131 and a ball screw nut 129 are formed with holes 131a, 129a penetrating therethrough in the radial directions. The presser member 131 is not formed with the thin cylindrical portion. Other points are the same as those in the embodiment discussed above, and hence their repetitive explanations are omitted.

In this modified example, after a proper pre-load is given by rotating the presser member 131, the holes 131a, 129a are filled with a molten resin 132. When the resin 132 defined as a hindering means is solidified, it follows that the presser member 131 is fixed to the ball screw nut 129 and does not slacken by dint of its shearing force and frictional force even when the strong force is transferred from the rack shaft 22, whereby the ball with the backlash can be stably retained within the ball screw nut 129.

Note that if desiring a decomposition of the ball bearing 25, the resin 132 is sheared when the presser member 131 is rotated by a strong force, and therefore the presser member 131 and the ball bearing 25 can be removed from the ball screw nut 129. When reassembling the components, the resin 132 is removed from the holes 129a, 139a, and the components may be assembled in the same steps.

Figure 6:
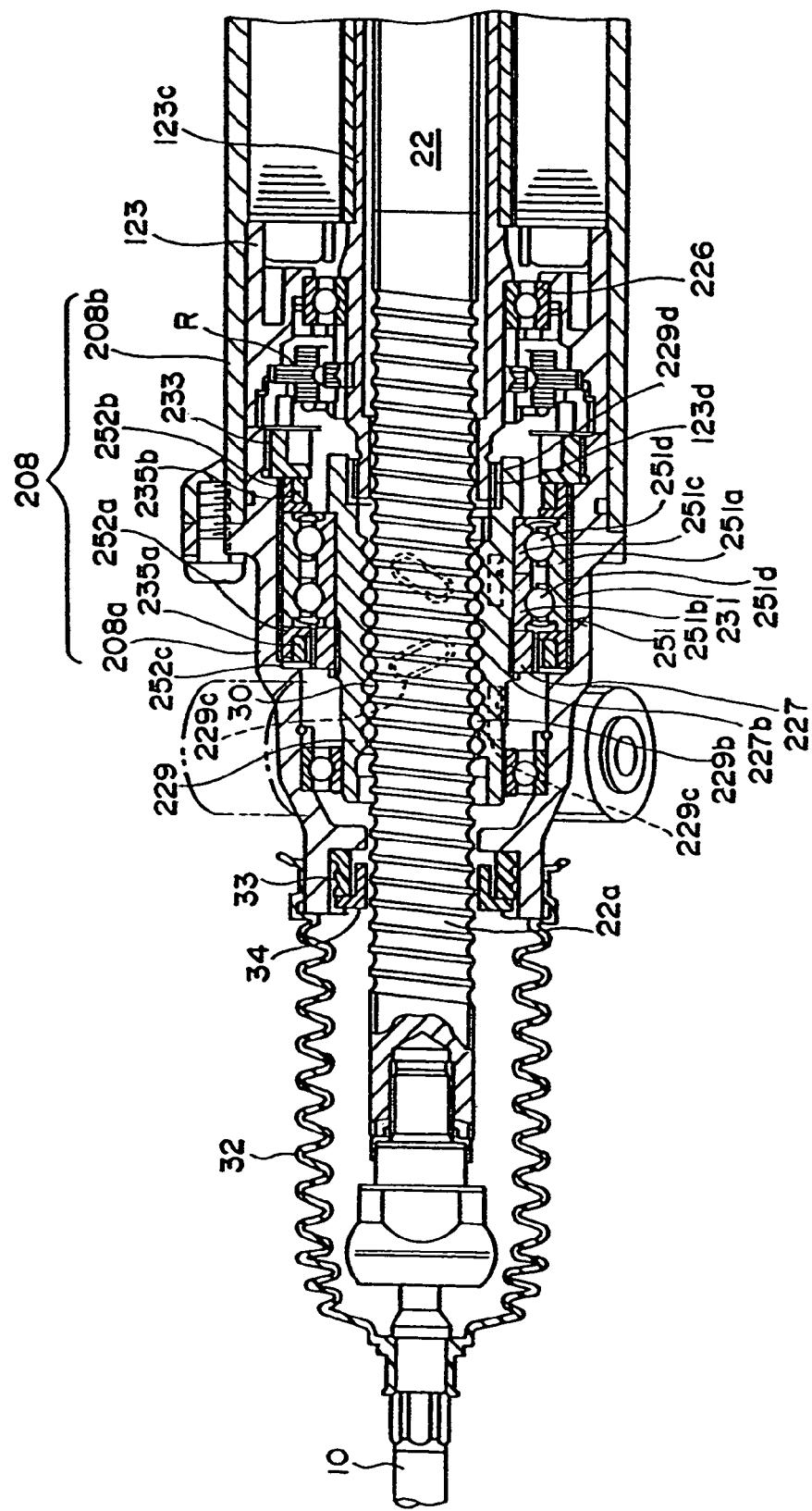
FIG. 6 is a sectional view taken in an axial direction, showing the periphery of the rack shaft coaxial type brushless motor in the electrically driven power steering apparatus in a second embodiment.

FIG. 6 is a sectional view taken in an axial direction, showing the periphery of the rack shaft coaxial type brushless motor in the electrically driven power steering apparatus in a second embodiment. Only a difference in the second embodiment is a configuration of the periphery of the ball screw nut. Therefore, the discussion will be focused on this configuration, and the same components as those in the first embodiment are marked with the same numerals of which the explanations are omitted. A rack housing 208 constructed of a small-diameter portion 208a and a large-diameter portion 208b is fixed to the unillustrated car body with an unillustrated bracket. The rack shaft 22 is inserted into the large-diameter portion 208a of the rack housing 208 and connected at its two side ends to tie rods 9 (FIG. 1), 10. The tie rods 9, 10 are connected to an unillustrated steering mechanism.

A rotor 123c of a brushless motor 123 inserted into the rack housing 208 is so supported by a bearing 226 as to be rotatable along within the rack housing 208. A left side end of the rotor 123c is spline-engaged with a right side end of a ball screw nut 229 taking substantially a shape of circular tube, and the rotor and the screw nut are, though integrally rotatable, relatively movable in the axial direction. A resin is coated over at least one of a toothed surface of a female spline 229d formed in the ball screw nut 229 (or the rotor 123c) and a toothed surface of a male spline 123d formed on the rotor 123c (or the ball screw nut 229) which are spline-engaged with each other. With this contrivance, when an impact is exerted such as impinging upon a steering stopper, the resin coating absorbs the impact, thus scheming to prevent an emission of butting noises. The ball screw but 229 has an internal helical screw groove 229b formed inside, and the internal screw groove 229b forms a rolling path facing to an external screw groove 22a formed in a left side portion of the rack shaft 22, wherein a plurality of balls 30 are accommodated in the rolling path.

The balls 30 are used for reducing a frictional force generated when the ball screw nut 229 and the rack shaft 22 relatively rotate. Note that the ball screw nut 229 has a circulation path 229c, wherein the balls 30 can be circulated through the circulation path 229c when the ball screw nut 229 rotates.

An angular contact type bearing 251 for rotatably supporting the ball screw nut 229 is provided along an inner periphery of the small-diameter portion 208a of the rack housing 208 via a thin cylindrical slide bush 231. The bearing 251 is constructed of an outer ring 251a, a couple of inner rings 251b, 251c and two trains of balls 251d disposed between the two rings.

A couple of flanged cylindrical core metals 252a, 252b each assuming an L-shape in section on one side are disposed in a way of coming into contact with the both side ends of the outer ring 251a of the bearing 251. A ring-shaped elastic member 235a is disposed between the left-sided core metal 252a and a spacer fitted to the small-diameter portion 208a. On the other hand, a ring-shaped elastic member 235b is disposed between the right-sided core metal 252b and a nut 233 screwed to the small-diameter portion 208a.

The inner rings 251b, 251c of the bearing 251 are fitted to the ball screw nut 229 through a nut 227 screwed to the outer periphery of the left side end of the ball screw nut 229.

According to this embodiment, the nut 227 is screwed to the ball screw nut 229 with a torque small enough not to cause a deformation of the circulation path 229c, and thereafter the thin cylindrical portion 227b extending in the axial direction from the nut 227 is caulked in the radial direction so as to deform in a way of being pressed strong against the outer periphery of the ball screw nut 229. The nut 227 is thereby so connected as to be impossible of a relative rotation with respect to the ball screw nut 229, and does not slacken even when the strong force is transferred from the rack shaft 22.

According to this embodiment, if a large impact is exerted on the rack shaft 22 serving as the ball screw shaft such as an impingement upon the steering stopper and so on, the ball screw nut 129 is permitted to move together with the bearing 251 in the axial direction while being supported by the slide bush 231. In such a case, however, in addition to the above-described effect of the resin coating over the spline teeth, the elastic members 235a, 235b can effectively absorb the impact and restrain the emission of the butting noises.

The present invention has been discussed so far by way of the embodiments. The present invention should not, however, be construed as being limited to the embodiments described above and can be, as a matter of course, properly modified and improved. For example, the hindering means for preventing the presser member from slackening may be a filler, coated between the male thread and the female thread, for increasing the inter-thread frictional force.

Figure 7:
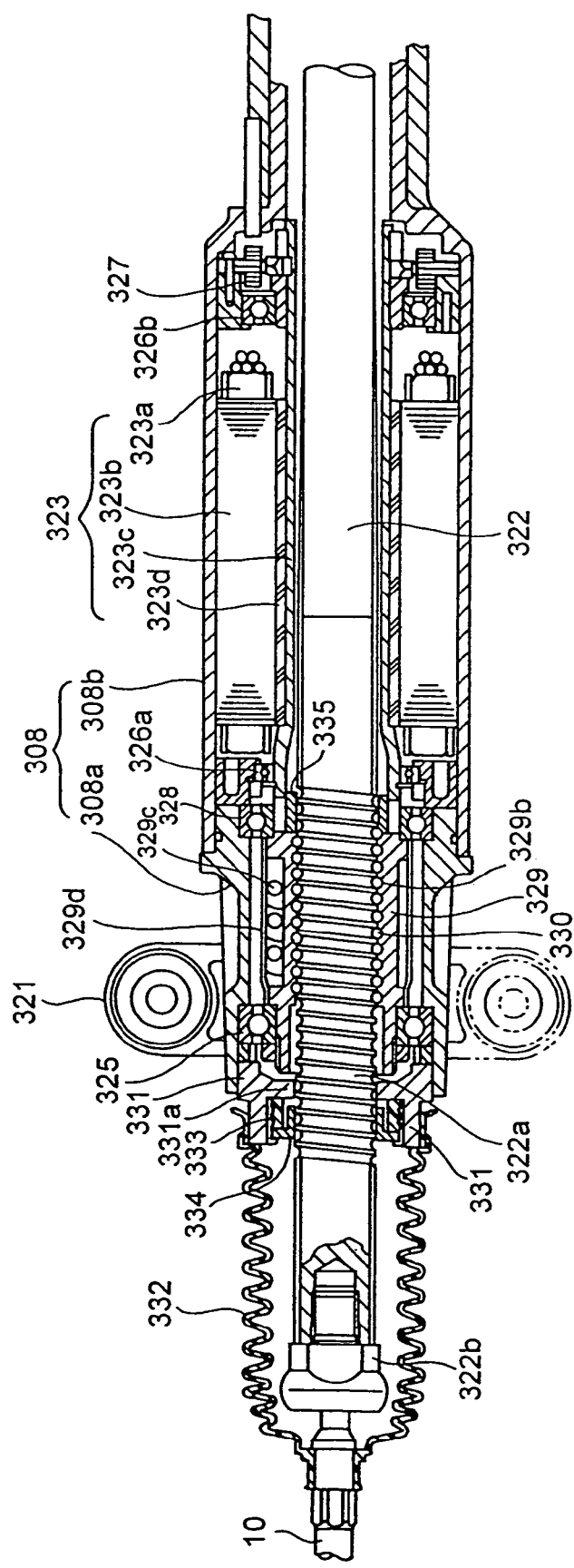
FIG. 7 is a sectional view taken in the axial direction, showing the periphery of the rack shaft coaxial type brushless motor in a third embodiment.

FIG. 7 is a sectional view taken in an axial direction, showing the periphery of the rack shaft coaxial type brushless motor in the electrically driven power steering apparatus in a third embodiment. A rack housing 308 constructed of a small-diameter portion 308a and a large-diameter portion 308b is fixed to the unillustrated car body with a bracket 321 formed integrally with the small-diameter portion 308a. A rack shaft 322 is inserted into the large-diameter portion 308a of the rack housing 308 and connected at its two side ends to tie rods 9 (FIG. 1), 10. The tie rods 9, 10 are connected to an unillustrated steering mechanism. Note that the rack shaft 22 constitutes a ball screw shaft.

A stator 323b taking a shape of circular tube is fixed within the rack housing 308, and a coil 323a constructed of a plurality of segments wound on a part of the stator 323b, is also provided therein. A rotor 323c taking a shape of long and thin circular tube is so provided as to insert into the stator 323b. A cylindrical magnet 323d for driving is provided facing to the stator 323a on an outer periphery of the rotor 323c. The drive magnet 323d is magnetized to for forming N- and S-poles alternately in the circumferential direction. The rack shaft 322 extends within the rotor 323c. Note that the stator 323b, the coil 323a, the rotor 323c and the drive magnet 323d constitute the brushless type electric motor 323.

The rotor 323c is so supported as to be rotatable along within the rack housing 308 by bearings 326a, 326b. A resolver 327 for detecting a polarity phase is attached to the outer periphery of the rotor 23c in the vicinity of the bearing 326b. This resolver 327 is disposed to exhibit a given correlation with the polarity in order to detect the polarity of the drive magnet 323d. An electric signal indicating the polarity phase detected by the resolver 327 is outputted to the controller 13 (FIG. 1) via an unillustrated wire.

The controller 13 supplies and distributes the electric current sequentially to the segments of the respective coils 323a divided in the rotational direction, and as a result the brushless motor 323 is drive-controlled to generate a predetermined rotational output.

A left side end of the rotor 323c engages with a right side end of a ball screw nut 329 taking substantially a circular tube-like shape in a mode that will hereinafter be explained. The rotor 323c and the ball screw nut 329 rotate integrally. The ball screw nut 329 has an internal helical screw groove 329b formed inside, and the internal screw groove 329b forms a rolling path facing to an external screw groove 322a formed in a left side portion of the rack shaft 322, wherein a plurality of balls 330 are accommodated in the rolling path.

The balls 330 are used for reducing a frictional force generated when the ball screw nut 329 and the rack shaft 322 relatively rotate. Note that the ball screw nut 329 has a tube 329c serving as a circulation path formed inside, wherein the balls 330 can be circulated through the tube 329c when the ball screw nut 329 rotates. A cylindrical member 329d having a tube holding function and a function of preventing a leak of grease.

A left side end of the ball screw nut 329 is so supported by a 4-point contact type ball bearing 325 as to be rotatable with respect to the small-diameter portion 308a of the rack housing 308 as well as being regulated in its position in the axial direction. A right side end of the ball screw nut 329 is so supported by a ball bearing 328 as to be rotatable with respect to the small-diameter portion 308a of the rack housing 308.

A cylindrical member 331 having an inward flange 331a is screwed to a left side end of the small-diameter portion 308a of the rack housing 308. A bellow-shaped dust-proof boot 332 connects an outer periphery of the cylindrical member 331 to an outer periphery of the tie rod 10. A rack stroke damper 333, which is composed of a rubber or resin and has a groove formed in its outer periphery to get easy to deform, is fitted facing to the flange 331a inwardly of the cylindrical member 331 by use of a presser plate 334 taking substantially an L-shape in section. Even if the rack shaft 322 energetically displaces and a swollen side end 322b of the rack shaft 322 impinges upon the presser plate 334, the impingement of the side end 322b is damped by the rack stroke damper 333 disposed on the underside of the presser plate 334, thereby making it possible to prevent damages to the ball screw nut 329, the shaft 322 and the bearings 325, 328.

Figure 8:
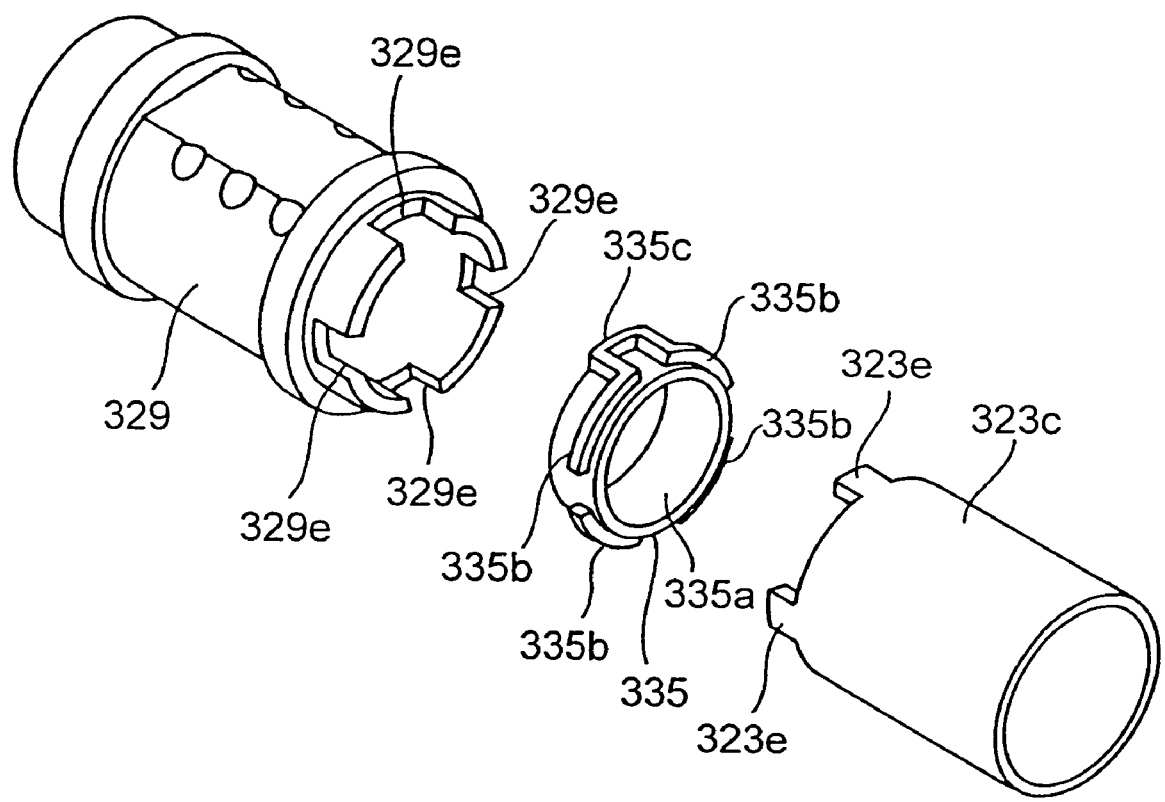
FIG. 8 is a perspective view showing the ball screw nut and a rotor of a motor in separation.

FIG. 8 is a perspective view showing the ball screw nut 329 and the rotor 323c of the motor 323 in separation. Referring to FIG. 8, four rectangular notches 329e are formed at an equal interval in the peripheral direction in the side end portion of the ball screw nut 329. On the other hand, rectangular protrusions 323e are formed at an equal interval in the peripheral direction on the side end portion, facing thereto, of the rotor 323c. A width (a length in the peripheral direction) of the notch 329e is set larger than a width (a length in the peripheral direction) of the protrusion 323e.

An elastic member 335 is disposed between the ball screw nut 329 and the rotor 323c. The elastic member 335 is constructed of a cylindrical core metal 335a, a rubber or resinous flange portion 335b welded to the outer periphery of the core metal 335a, and two elastic portions (elastic members) 335c each defined as substantially a C-shaped protrusion. An outside diameter of the core metal 335a is slightly smaller than an inside diameter of each of the ball screw nut 329 and of the rotor 323c. The flange portion 335b assumes a discontinuous configuration in the peripheral direction, corresponding to the protrusions 323e of the rotor 323c, and the elastic portions 335c are connected in a state where the (two) discontinuous portions (among the four discontinuous portions) of the flange portion 335b are shifted in the axial direction.

When the ball screw nut 329 and the rotor 323c are connected through the elastic members 335 serving as a connection member, the two face-to-face protrusions 323e of the rotor 323c engage with the notches 329e of the ball screw nut 329 with almost no clearance in a way that interposes the elastic portion 335c therebetween. On the other hand, the remaining two protrusions 323e of the rotor 323c engages with the notches 329e of the ball screw nut 329 with a predetermined clearance in the peripheral direction without any interposition of the elastic portion 335c. Note that the flange portion 335b is interposed between the end surface of the ball screw nut 329 and the end surface of the rotor 323c and hinders a direct contact of the ball screw nut 329 and the rotor 323c.

Next, an operation in this embodiment will be explained with reference to the drawings. Referring to FIG. 1, supposing that the vehicle travels straight and the steering force is not yet inputted to the rack shaft 322 FIG. 7) from the steering wheel 1, the torque detection signal Tv outputted from the torque sensor 3 is a neutral voltage or substantially neutral voltage, and hence the controller 13 does not perform the rotational control of the brushless motor 323 (FIG. 7). Accordingly, the present electrically driven power steering apparatus is in a state of not outputting the assistive steering force.

On the other hand, when the vehicle turns a curve, the steering wheel 1 is steered, and the steering force is transferred to the rack shaft 322. Therefore, the torque sensor 3 outputs the torque detecting signal Tv corresponding to a steering torque, and the controller 13 rotates the rotor 323c of the brushless motor 323 with a proper torque in a way that takes a detection signal Vp transmitted from the speed sensor 17 into consideration. When the rotor 323c rotates, the ball screw nut 329 also rotates with the result that the rack shaft 322 moves in the left or right direction, thereby generating the assistive steering force.

Herein, if the traveling wheel collides with a paved step of the sidewalk in the vicinity of the neutral position where the rack stroke damper 333 does not function, the impact is transferred to the rack shaft 322. In such a case, the elastic member 335 torsionally deforms and can thus absorb the impact. Further, when the ball screw nut 329 and the rotor 323c relatively rotate through predetermined or larger angles with the torsional deformation of the elastic member 335, the notch 329e as a recessed portion of the elastic portion 335c and the protrusion 323e as a protrusion, which function as a displacement limiter, are brought into contact with each other, thus preventing a damage to the elastic member 335 by limiting a further torsional deformation of the elastic member 335.

Note that a natural oscillation frequency of torsional oscillations in the system consisting of the rotor 323c and the ball screw nut 329 including the elastic member 335, is 5 Hz or higher, preferably 7 Hz or higher, more preferably 8 Hz or higher so that the resonance does occur in the system as a control system.

Figure 9:
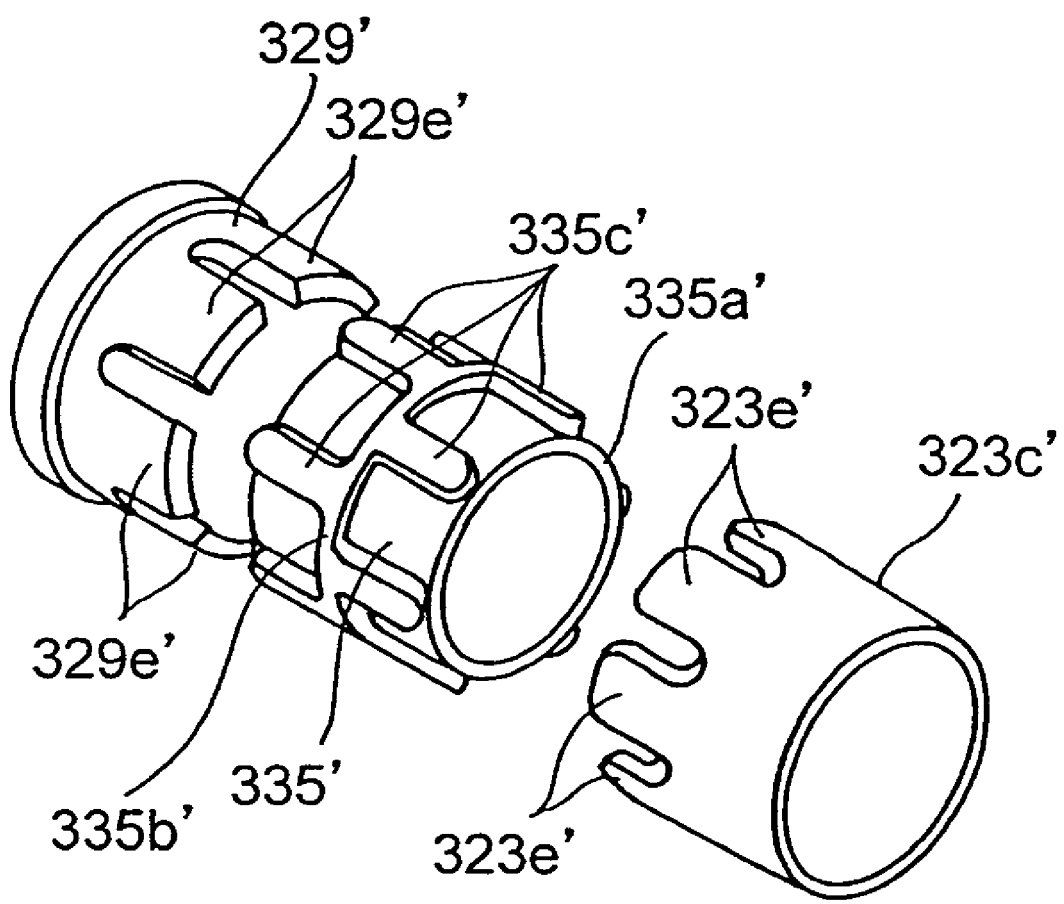
FIG. 9 is a perspective view showing a modified example of this embodiment.

FIG. 9 is a perspective view showing a modified example of this embodiment. Referring to FIG. 9, a side end of a ball screw nut 329' has rectangular protrusions 329e' formed at an equal interval in the peripheral direction. On the other hand, a side end, facing thereto, of a rotor 323c' has rectangular protrusions 323e' formed at an equal interval in the peripheral direction.

An elastic member 335' is disposed between the ball screw nut 329' and the rotor 323c'. The elastic member 335' is constructed of a cylindrical core metal 335a', a rubber or resinous flange portion 335b' extending over the entire outer periphery of the core metal 225a' in the peripheral direction at the center thereof, and a rubber or resinous engagement portion (elastic member) 225c' with its fingers alternately extending on both sides in the axial direction, this engagement portion being integral with the flange portion 335b'. An outside diameter of the core metal 335a' is slightly smaller than an inside diameter of each of the ball screw nut 329' and of the rotor 323c'.

When the ball screw nut 329' and the rotor 323c' are connected through the elastic members 335', the protrusion 329e' of the ball screw nut 329' engages with the engagement portion 335c' in a way that enters with almost no space, while the protrusion 323e' of the rotor 323c' also engages with the engagement portion 335c' in a way that enters with almost no space. At this time, the flange portion 335b' is interposed between the end surface of the ball screw nut 329' and the end surface of the rotor 323c' and hinders a direct contact of the ball screw nut 329' and the rotor 323c'.

In this modified example, if the traveling wheel collides with the paved step of the sidewalk and the impact is transferred to the rack shaft 322, the engagement portion 335c' of the elastic member 335' elastically deforms, thereby absorbing this impact.

Figure 10:
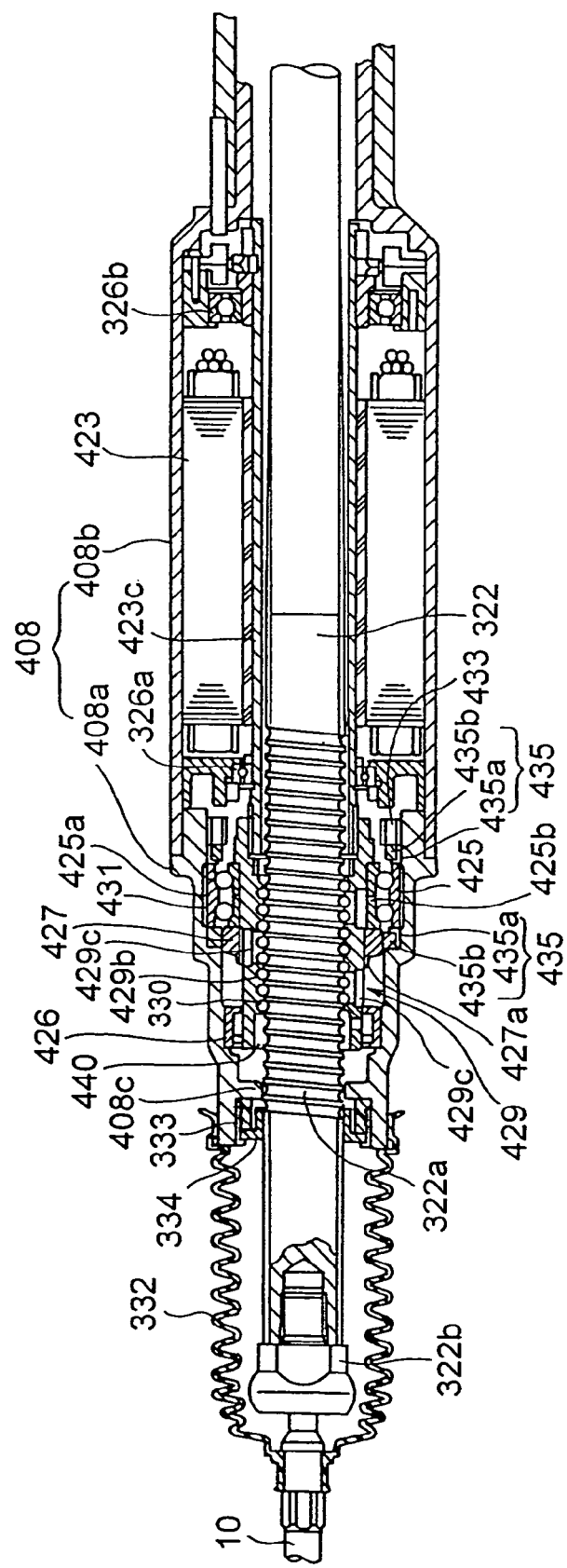
FIG. 10 is a sectional view taken in an axial direction, showing the periphery of the rack shaft coaxial type brushless motor in the electrically driven power steering apparatus in a fourth embodiment.

FIG. 10 is a sectional view taken in an axial direction, showing the periphery of the rack shaft coaxial type brushless motor in the electrically driven power steering apparatus in a fourth embodiment. Only a difference in the fourth embodiment is a configuration of the periphery of the ball screw nut. Therefore, the discussion will be focused on this configuration, and the same components as those in the first embodiment are marked with the same numerals of which the explanations are omitted. A rack housing 408 constructed of a small-diameter portion 408a and a large-diameter portion 408b is fixed to the unillustrated car body with an unillustrated bracket. The rack shaft 322 is inserted into the large-diameter portion 408a of the rack housing 408 and connected at its two side ends to tie rods 9 (FIG. 1), 10. The tie rods 9, 10 are connected to an unillustrated steering mechanism.

A rotor 423c of a brushless motor 423 is so supported by bearings 326a, 326b as to be rotatable along within the rack housing 408. A left side end of the rotor 423c is spline-engaged with a right side end of a ball screw nut 429 taking substantially a shape of circular tube, and the rotor and the screw nut thereby integrally rotate. A resin is coated over at least one of toothed surfaces of female and male splines meshing with each other, thereby scheming to prevent an emission of butting noises. The ball screw but 429 has an internal helical screw groove 429b formed inside, and the internal screw groove 429b forms a rolling path facing to an external screw groove 322a formed in a left side portion of the rack shaft 322, wherein a plurality of balls 330 are accommodated in the rolling path.

The balls 330 are used for reducing a frictional force generated when the ball screw nut 429 and the rack shaft 322 relatively rotate. Note that the ball screw nut 429 has a circulation path 429c formed inside, wherein the balls 330 can be circulated through the circulation path 429c when the ball screw nut 429 rotates.

A rubber or resinous damping member 440 taking a configuration corresponding to the outer periphery of the rack shaft 322 is so fitted to the inner periphery of the left side end of the ball screw nut 429 as to come into contact with the outer periphery of the rack shaft 322. For example, if the rack shaft 322 is oscillated through the traveling wheel on the rugged surface of the road, the noises are generated when the balls 330 bounce by a backlash between the rolling surface and the ball 330 and impinge on the rolling surface. It is, however possible to restrain the emission of the noises by providing the damping member 440 to restrain the oscillations of the rack shaft 322 due to the impingement of the balls 330. Further, an inside-diametrical portion of the damping member 440 is formed with a male thread groove engaging with an external thread groove of the rack shaft 322, and this has a so-called sealing function of preventing the grease in the ball screw nut 429 from leaking outside.

The outer periphery in the vicinity of the right side end of the ball screw nut 429 is so supported by a plurality of trains of angular contact ball bearings 425 as to be rotatable with respect to the small-diameter portion 408*a* of the rack housing 408 and to be regulated in its position in the axial direction. On the other hand, the outer periphery of the left side end of the ball screw nut 429 is so supported by a roller bearing 426 as to be rotatable with respect to the small-diameter portion 408*a* of the rack housing 408.

An inner ring 425*b* of the angular contact ball bearing 425 is fitted by a nut 427 screwed to the outer periphery of the ball screw nut 429. The nut 427 will be explained later on. An outer ring 425*a* of the angular contact ball bearing 425 is attached to the inner periphery of the small-diameter portion 408*a* through a thin cylindrical slide bush 431. Each of elastic members 435 disposed in a state of being brought into contact with both sides of the outer ring 425*a* includes a flanged cylindrical core metal 435*a* taking substantially an L-shape in section on one side and fixed to the inner periphery of the small-diameter portion 408*a*, and a rubber or resinous elastic member 435*b*. Note that a thread member 433 coming into contact with the right-sided elastic member 435*b* is so fitted to the small-diameter portion 408*a* as to be adjustable in order to adjust an interval between the elastic members 435.

A bellow-shaped dust-proof boot 332 connects an outer periphery of the left side end of the small-diameter portion to an outer periphery of the tie rod 10. A rubber or resinous rack stroke damper 333 having a groove formed in its outer periphery to get easy to deform, is fitted facing to a flange 408*c* of the small-diameter portion 408*a* by use of a flanged cylindrical presser plate 334 taking substantially an L-shape in section on one side. Even if the rack shaft 322 energetically displaces and a swollen side end 322*b* of the rack shaft 322 impinges upon the presser plate 334, the impingement of the side end 322*b* is damped by the rack stroke damper 333 disposed on the underside of the presser plate 334, thereby making it possible to prevent damages to the ball screw nut 429 and the bearing 425.

If the traveling wheel collides with the paved step of the sidewalk in the vicinity of the neutral position where the rack stroke damper 333 does not function and the impact is transferred to the rack shaft 322, the elastic portion 435*b* of the elastic member 435 elastically deforms in the axial direction, whereby the impact can be absorbed.

Note that when the ball screw nut 429 and the rotor 423*c* relatively rotate through predetermined angles, further rotations thereof be, it is preferable, hindered by unillustrated stoppers. This is because, with this contrivance, a damage to the elastic portion 435*b* can be prevented by restraining an excessive deformation of the elastic portion 435*b*.

Moreover, according to this embodiment, the nut 427 is screwed to the ball screw nut 429 with the torque small enough not to cause the deformation of the circulation path 429*c*, and thereafter the thin cylindrical portion 427*a* extending in the axial direction from the nut 427 is caulked in the radial direction so as to deform in a way of being pressed strong against the outer periphery of the ball screw nut 429. The nut 427 is thereby so connected as to be impossible of a relative rotation with respect to the ball screw nut 429, and does not slacken even when the strong force is transferred from the rack shaft 322.

Figure 11:
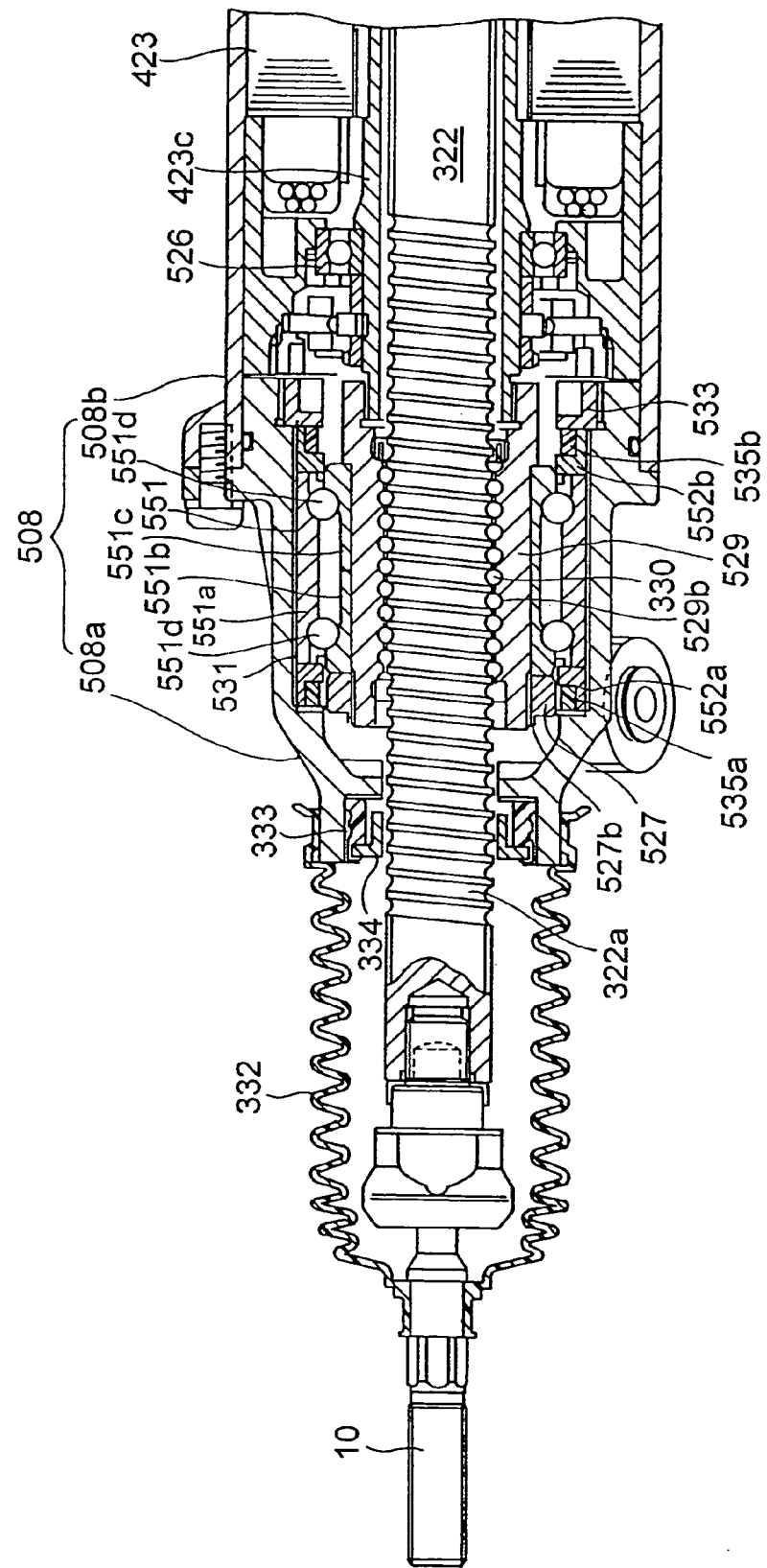
FIG. 11 is a sectional view taken in an axial direction, showing the periphery of the rack shaft coaxial type brushless motor in the electrically driven power steering apparatus in a fifth embodiment.

FIG. 11 is a sectional view taken in an axial direction, showing the periphery of the rack shaft coaxial type brushless motor in the electrically driven power steering apparatus in a fifth embodiment. Only a difference in the fourth embodiment is a configuration of the periphery of the ball screw nut. Therefore, the discussion will be focused on this configuration, and the same components as those in the first embodiment are marked with the same numerals of which the explanations are omitted. A rack housing 508 constructed of a small-diameter portion 508*a* and a large-diameter portion 508*b* is fixed to the unillustrated car body with an unillustrated bracket. The rack shaft 322 is inserted into the large-diameter portion 508*a* of the rack housing 508 and connected at its two side ends to tie rods 9 (FIG. 1), 10. The tie rods 9, 10 are connected to an unillustrated steering mechanism.

A rotor 423*c* of a brushless motor 423 is so supported by bearings 526 as to be rotatable along within the rack housing 508. A left side end of the rotor 423*c* is spline-engaged with a right side end of a ball screw nut 529 taking substantially a shape of circular tube, and the rotor and the screw nut thereby integrally rotate. A resin is coated over at least one of toothed surfaces of female and male splines meshing with each other, thereby scheming to prevent an emission of butting noises. The ball screw but 529 has an internal helical screw groove 529*b* formed inside, and the internal screw groove 529*b* forms a rolling path facing to an external screw groove 322*a* formed in a left side portion of the rack shaft 322, wherein a plurality of balls 330 are accommodated in the rolling path.

The balls 330 are used for reducing a frictional force generated when the ball screw nut 529 and the rack shaft 322 relatively rotate. Note that the ball screw nut 529 has a circulation path (not shown) formed inside, wherein the balls 330 can be circulated through the circulation path 429*c* when the ball screw nut 529 rotates.

A bearing 551 for rotatably supporting the ball screw nut 529 is disposed on an inner periphery f the small-diameter portion 508*a* of the rack housing 508 through a thin cylindrical slide bush 531. The bearing 551 is constructed of an outer ring 552*a*, a couple of inner rings 551*b*, 551*c* and two trains of balls 551*d* disposed between the two rings.

A flanged cylindrical spacer 552*a* taking an L-shape in section on one side and an elastic member 535*a* are disposed between a left side end of the outer ring 551*a* of the bearing 551 and the small-diameter portion 508*a*. A flanged cylindrical spacer 552*b* taking an L-shape in section on one side and an elastic member 535*b* are disposed between a right side end of the outer ring 551*a* of the bearing 551 and a thread member 533 screwed to the small-diameter portion 508*a*. The inner rings 551*b*, 551*c* of the bearing 551 are fitted to the ball screw nut 529 by a nut 527 screwed to the outer periphery of the left side end of the ball screw nut 529. Note that an assembly width of the inner rings 551*b*, 551*c* is set larger than an axial range of top holes for circulating the balls, thereby scheming to prevent the leak of the grease and the tops from being removed.

If the traveling wheel collides with the paved step of the sidewalk in the vicinity of the neutral position where the rack stroke damper 333 does not function and the impact is transferred to the rack shaft 322, any one of the elastic members 535*a*, 535*b* elastically deforms in the axial direction, whereby the impact can be absorbed. Note that when each of the elastic members 535*a*, 535*b* deforms in excess of a predetermined quantity, a side end of the spacer 552*a* or 552b serving as a displacement limiter is bottomed, thereby limiting further deformations of the elastic members 535a, 535b.

Moreover, according to this embodiment, the nut 527 is screwed to the ball screw nut 529 with the torque small enough not to cause the deformation of the circulation path, and thereafter the thin cylindrical portion 527a extending in the axial direction from the nut 527 is caulked in the radial direction so as to deform in a way of being pressed strong against the outer periphery of the ball screw nut 529. The nut 527 is thereby so connected as to be impossible of a relative rotation with respect to the ball screw nut 529, and does not slacken even when the strong force is transferred from the rack shaft 322.

The present invention has been discussed so far by way of the embodiments. The present invention should not, however, be construed as being limited to the embodiments described above and can be, as a matter of course, properly modified and improved. For example, this embodiment has exemplified the coaxial type brushless motor, however, the present invention can be of course applied to the electrically driven power steering in which the motor shaft and rack shaft are independent, and the drive torque transmission therebetween is performed by a reduction gear and so on. Further, the present invention is not confined to this parallel geometry.

Figure 18:
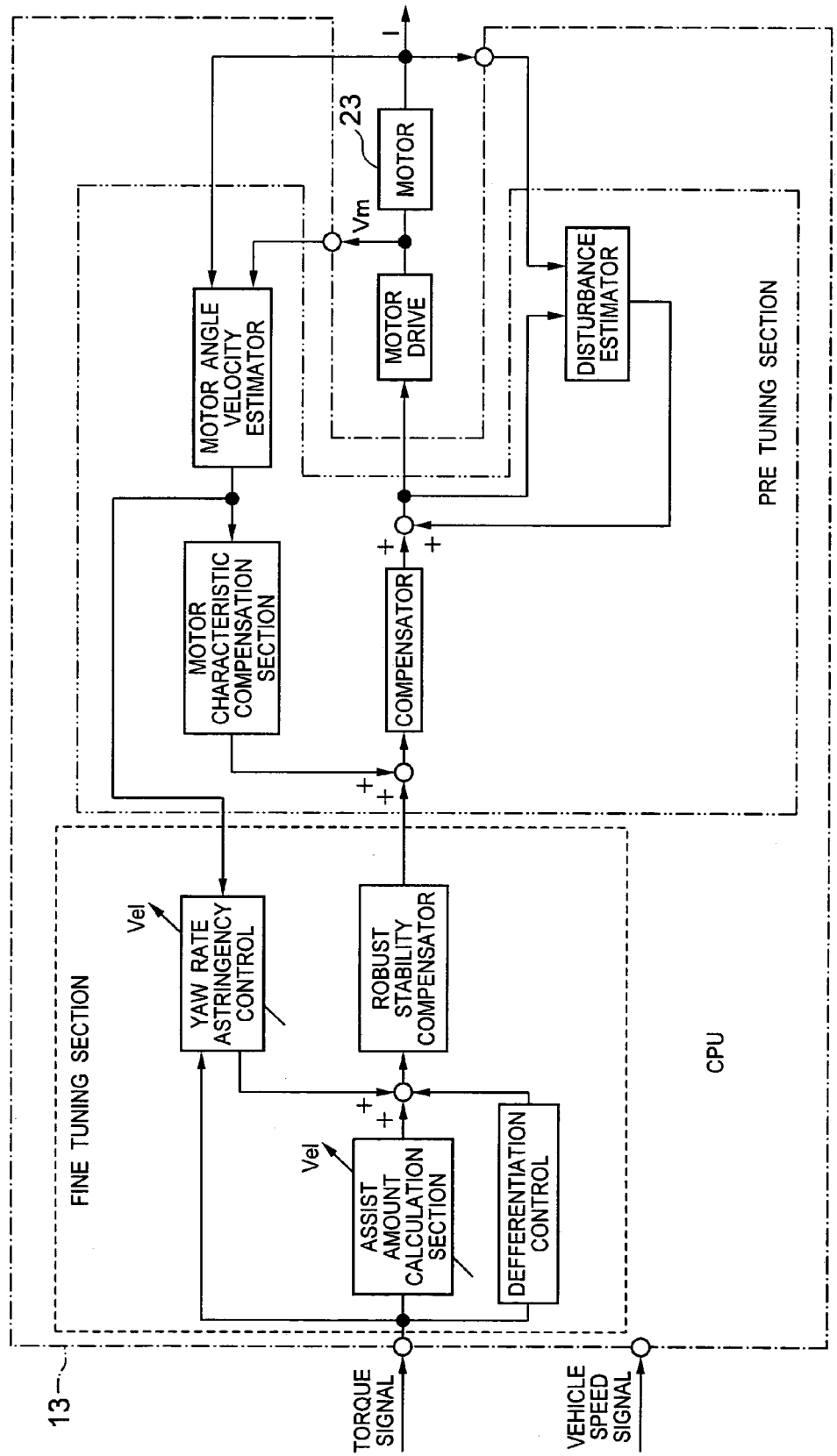
FIG. 18 is a block chart showing a controller for controlling with a friction compensation in another embodiment of a motor-operated power steering device.

In FIG. 18, a controller 13 (reference to FIG. 1) for controlling a motor-operated power steering device, adds to an assist value (steering assist order value), a value proportional to a differentiation value of a steering torque signal in order to improve a response of the control system, so that a response of an assist torque and a stability of the torque control system can be improved. Therefore, a signal differentiated from a torque amount is added to the assist amount. In addition, when a steering torque is relatively large and a steering wheel returns, that is, a steering angle θ is reduced, a minus gain is applied, so that it is prevented to quickly reduce an assist amount (steering assist order value), as a result thereof, a larger Hysteresis characteristic is established in a high torque zone, and a smaller Hysteresis characteristic is established in a low torque zone which is the neighborhood of a neutral point.

That is, the controller 13 controls with friction compensation based upon a torque signal Tr which is a detected torque value, the motor 23 (reference to FIG. 1), in order to compensate an influence of a friction thereof. The friction compensation control makes speedy, a response of a torque control in a low steering torque zone which is the neighborhood of a center, and functions to reduce a torsion angle of a torsion bar. On the other hand, the friction of the motor 23 functions to increase the torsion angle thereof. Therefore, if the friction of the motor 23 can be detected as a torsion angle, the controller 13 can control with friction compensation.

However, in a prior art, the torsion bar is disposed at a side of the steering wheel, so that a friction compensation control can be achieved to an input from the side of the steering wheel but can not be achieved to an input from a road, such as a "kick-back". Accordingly, such a friction compensation control can not suppress a rattle noise often generated in a rack and pinion type movement conversion mechanism.

On the other hand, in an elastic region of the elastic members 235a, 235b shown in FIG. 6 or the elastic member 335, 335' shown in FIGS. 8 and 9, an input from the road can be detected by the torque sensor, so that a friction compensation control can be effective to such an input from the road. Once, the controller 13 makes a friction compensation control, the friction of the motor 23 is compensated and the torque sensor can detect an input from the road. That is, a "kick-back" force can be escaped from the a rack and pinion type movement conversion mechanism to the side of the steering wheel, because of the elastic members 235a, 235b or 335, 335' and the friction compensation control. Moreover, if the friction compensation control in the controller 13 is tuned, a rattle noise generated in the rack and pinion type movement conversion mechanism can be suppressed and a tuning in which a road information is adequately transmitted to the steering wheel can be achieved.

If the elastic members 235a, 235b or 335, 335' are disposed in any position between a reduction mechanism of the motor 23 and another mechanism which provides a friction or an inertia, effects to prevent an over load generated in the rack and pinion type movement conversion mechanism, and to supply to an insufficient attenuation function of the "kick-back" force, and to suppress a rattle noise, and to reduce an influence of the frictional force of the motor, are obtained.

The invention is a motor-operated power steering device, in which a motor is controlled on the basis of an electric current order value calculated on the basis of a steering torque generated on a steering shaft and a current detection value of said motor for generating a steering assist power, comprising, a torque filter processing a torque signal, a SELF ALIGNING TORQUE estimation functional section, and a SELF ALIGNING TORQUE filter processing a SELF ALIGNING TORQUE information from said SELF ALIGNING TORQUE estimation functional section, wherein a steering feeling (a transmission characteristic from a steering wheel rotation angle to a steering torque) and a frequency characteristic of a road information sensitivity (a transmission characteristic from a road counter force to a steering torque) can be designed independently to each other, in a two-dimensional flexibility control system. In accordance with the invention, a control system filling both an ideal steering feel and a frequency characteristic of a road information sensitivity, can be easily designed.

An adjustment for the road information sensitivity can be established by changing a suspension characteristic of a vehicle.

Embodiments of the invention are described in depth reference to the drawings. The invention can be applied to many types of a motor-operated power steering device having a ball screw mechanism, for example, not only a simple rack assist type but also a rack assist type combined with a column assist type, pinion assist type or the like, or a steer-by-wire type.

According to a motor-operated power steering device of the invention, comprises a torque filter processing a torque signal, a SELF ALIGNING TORQUE estimation functional section, and a SELF ALIGNING TORQUE filter processing a SELF ALIGNING TORQUE information from said SELF ALIGNING TORQUE estimation functional section. Therefore, a steering feeling and a frequency characteristic of a road information sensitivity can be designed independently to each other, in a two-dimensional flexibility control system.

Figure 12:
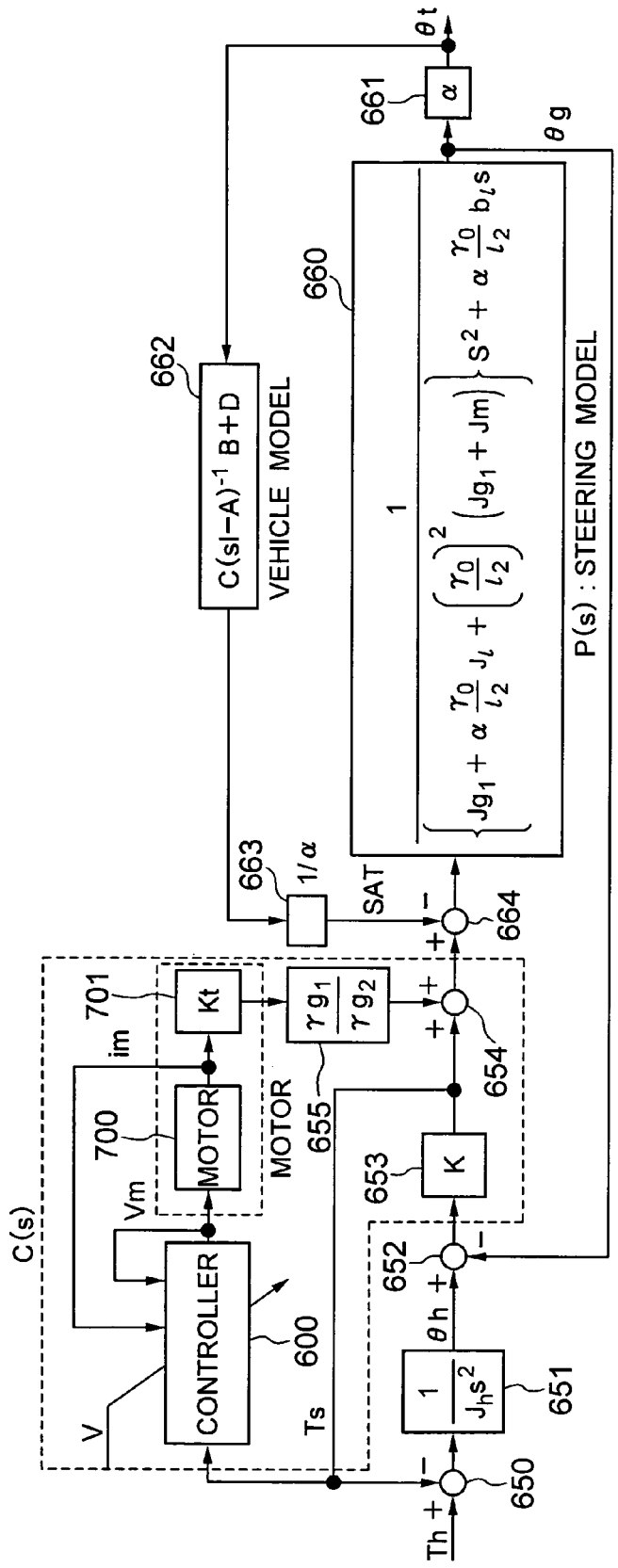
FIG. 12 is a block chart of a whole structure of a motor-operated power steering device of the invention.

FIG. 12 is a block chart of a whole structure of a motor-operated power steering device of the invention. A steering torque Th generated from a steering wheel is transmitted through a subtractor 650 to a steering block 651 (transfer function: 1/Jhs2), and is transmitted through a subtractor 652 to a controller C(s). A block 653 in the controller C(s) provides a rigidity of a torsion bar (transfer function: K). An output of the controller C(s) is inputted through a subtractor 664 to a steering model 660 (transfer function: P(s)), and an output θg from the transfer model 660 is feed-backed to a subtractor 652, and is outputted through an over all steering gear ratio 661 (transfer function: α), and is inputted through a vehicle model 662 (transfer function: C(sI−A)−1) and a feed back block 663 (transfer function: 1/α), to the subtractor 664 as SELF ALIGNING TORQUE (SAT) information. The steering model 660 and the vehicle model 662 are known.

Figure 13:
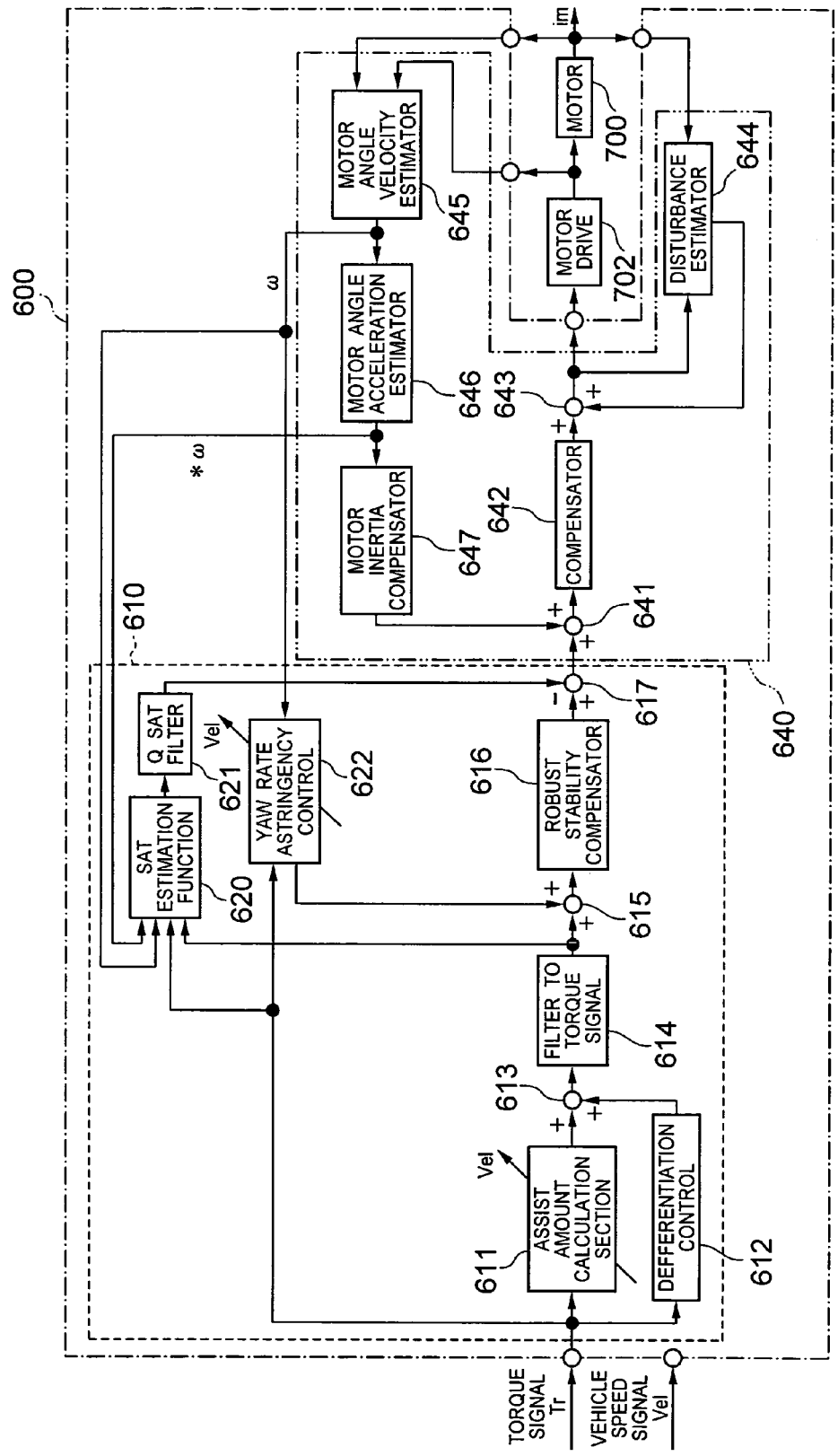
FIG. 13 is a block chart showing an example of a structure of a control unit.

Controller C(s) comprises a control unit 600, a reduction gear ratio (transfer function: rg1/rg2), a torsion bar 653 (transfer function: K), and an adder 654, in order to controllably drive a steering assist motor 700. A motor current (im) of the steering assist motor 700 is inputted into the control unit 600, and inputted through a torque constant 701 (transfer function: Kt) and a reduction gear ratio 655, into the adder 654. A detail of the control unit 600 is a block structure as shown in FIG. 13, which comprises a torque controller 610 and a motor drive system 640, in order to control the motor 700 through a motor driver 702.

A torque signal Tr is individually inputted into an assist amount calculator 611, a differentiation control 612, a yaw rate astringency control 622, and SAT estimation function 620. A vehicle speed signal Vel is individually inputted into the assist amount calculator 611 and the yaw rate astringency control 622. An output of the assist amount calculator 611 is inputted into the adder 613 together with an output from the differentiation control 612, and the added result thereof is inputted into a torque filter 614 to be processed, and the processed filter output is inputted into the SAT estimation function 620, and is inputted through the adder 115 into a Robust stability compensator 616. An output from the yaw rate astringency control 622 is inputted into the adder 115, too. SAT information from the SAT estimation function 120 is processed in a SAT filter 621 and is inputted into a subtractor 617 together with an output from the Robust stability compensator 616, and is processed therein.

The output from the Robust stability compensator 616 is inputted through the subtractor 617 into an adder 641 in the motor drive system 640, and the added result therefrom is inputted through a compensator 642 into an adder 643, and the added result therefrom is inputted into the motor driver 702 and a disturbance estimator 644. The motor 700 is driven by an output (terminal voltage) Vm, and the output Vm and the output current (im) are inputted into a motor angular velocity estimator 645. The output current (im) is inputted into the disturbance estimator 644, too. A motor angular velocity ω estimated in the motor angular velocity 645, is inputted into a motor angle acceleration estimator 646, the yaw rate astringency control 622, and the SAT estimation function 620. A motor angle acceleration $^*\omega$ is inputted into a motor inertia compensator 647, and is inputted into the SAT estimation function 620.

In the above structure, the assist amount calculator 611 calculates an assist amount on the basis of a torque signal Tr and the vehicle speed Vel with a predetermined formula. The differentiation control 612 functions to improve a high speed response in the neighborhood of a neutral point of the steering wheel, and to establish a smooth steering. The Robust stability compensator 616 is a structure similar to one shown in e.g. Japanese Patent Application Laid-open No. 8-290778 and the like, and has a characteristic formula G(s)=(s2+a1·s+a2)/(s2+b1·s+b2), in which (s) is Laplace operator. It eliminates a peak value of resonance frequency in a resonance system having an inertia element and a spring element included in the torque signal Tr, and compensates a phase shift of a resonance frequency preventing a stability and a response in the control system. The yaw rate astringency control 622 brakes a swaying and turning motion of the steering wheel in order to improve a yaw rate astringency of a vehicle. The motor inertia compensator 647 makes a motor inertia compensation value by multiplying the motor angle acceleration $^*\omega$ by a gain (plural stages). The disturbance estimator 644 is a structure similar to one shown in e.g. Japanese Patent Application Laid-open No. 8-310417 and the like. It can maintain a motor control characteristic desired in an output level of the control system, on the basis of a signal which is obtained by a current order value compensated in the compensator 642 as a target value of the motor output, and a motor current value (im), so as to establish a stability of the control system. Incidentally, the estimation of the angular acceleration in the motor angular estimator 645 is made in accordance with a known method, on the basis of the motor terminal voltage Vm and the motor current value (im).

The SAT estimation function 620 is described hereinafter. As the SAT estimation function 620, a structure shown in e.g. Japanese Patent Application Laid-open No. 2001-171844 of the same applicant, can be used. Details thereof follow.

Figure 15:
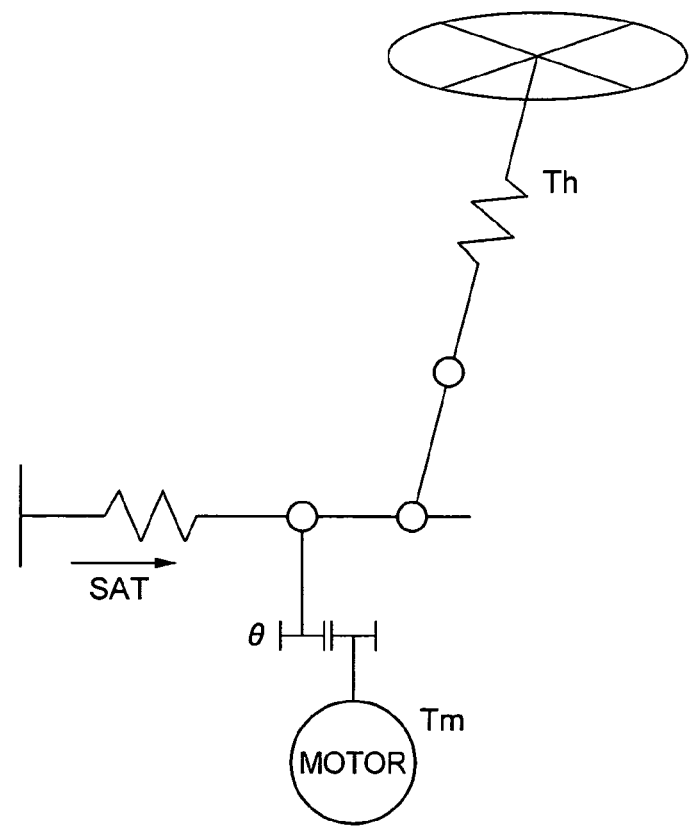
FIG. 15 is a drawing for explaining a SAT estimation.

FIG. 15 shows an acting torque generated from a road to a steering wheel. In FIG. 15, a steering torque Th is generated when a driver steers the steering wheel, and an assist torque Tm is generated in the motor on the basis of the steering torque Th. As the result thereof, wheels are steered and SAT is generated as a counter force. In this stage, a torque which is a resistant for steering, is generated by an inertia J of the motor and a (static) friction force Fr. The following movement equation (1) is obtained in consideration of a balance of the above forces.

$$J \cdot ^*\omega + Fr \cdot \text{sign}(\omega) + SAT = Tm + Th \qquad (1)$$

When the movement equation (1) is processed in a Laplace conversion as an initial value=0, and is solved to SAT, the following equation (2) is obtained.

$$SAT(s) = Tm(s) + Th(s) - J \cdot ^*\omega(s) + Fr \cdot \text{sign}(\omega(s)) \qquad (2)$$

As apparent from the equation (2), if the inertia J of the motor and the static friction force Fr are predetermined, SAT can be estimated by the motor angular velocity ω, the motor angle acceleration $^*\omega$, the steering assist power, and the steering signal. As the reason therefore, the torque signal Tr, the motor angular velocity ω, the motor angle acceleration $^*\omega$, and the output from the torque filter 614 of the assist amount calculator 611.

In addition, when the SAT information estimated in the SAT estimation function 620 is directly feed-backed, the steering becomes too heavy, so as not to improve a steering feel. Therefore, the estimated SAT information is processed with a SAT filter 621 having a frequency characteristic, so as to output only a necessary and sufficient information for improving a steering feel.

Figure 14:
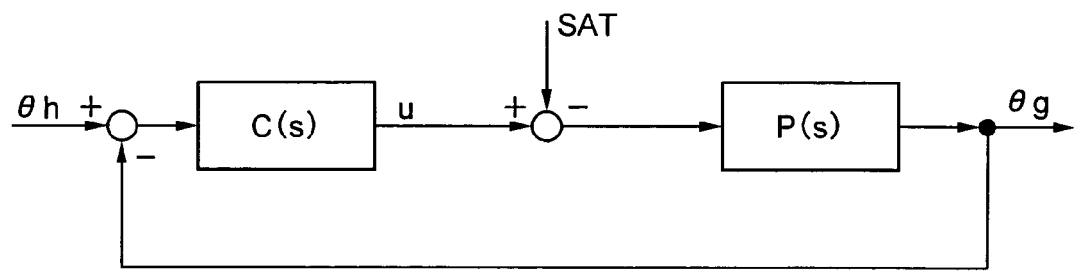
FIG. 14 shows a simplified structure of FIG. 13.

Next, a two-dimensional flexibility control system is described hereinafter. The control unit 600 in the block chart of FIG. 12 has a structure as shown in FIG. 13, which includes the torque filter 614 processing the torque signal Tr, the SAT estimation function 620 estimating SAT, the SAT filter 621 processing SAT information from the SAT estimation function 120. In the block chart of FIG. 12, the rigidity K of the torsion bar 653 and the controller of the electronically driven power steering are combined to a new controller C(s), and it can be a general control system as shown in FIG. 14, in which a steering system is P(s). In FIG.

14, the following equation (3) is obtained in consideration of a operation amount (u) outputted from the controller C(s).

$$u = Ts + Tm - Q \cdot \hat{S}\hat{A}T \quad (3)$$

In the above equation (3), Ts represents a steering torque (detected value), Tm represents a motor assist torque, Q represents a SAT filter which can be processed the SAT information in a frequency zone, and hat SAT is an estimated value according to the SAT estimation function. Therefore, in a case where a controller in which the SAT estimation function 620 and the filter 621 thereof are eliminated, is C'(s), and where the estimated value of SAT is equal to a real value of SAT (SAT=hat SAT), the following equation (4) is obtained. The controller C'(s) includes the torque filter 614 to the torque signal Tr.

$$\theta_g = \frac{PC}{1+PC'}\theta_h - \frac{(1+Q)P}{1+PC'}T_{sat} \quad (4)$$

In order to consider a steering feel Gsf (a transmission characteristic from a steering wheel angle Oh to a steering torque Ts) and a road information sensitivity (a transmission characteristic from a road counter force SAT to a steering torque Ts), when a value Ts=K(θh−θg) showing a torque detection characteristic is substituted into the equation (3), the following equation (5) is obtained.

$$T_s = \frac{K}{1+PC'}\theta_h - \frac{K(1+Q)P}{1+PC'}T_{sat} \quad (5)$$

The road information sensitivity Gds and the steering feel Gsf are individually shown By the following equations (6) and (7).

$$Gds = \{K(1+Q)P\}/(1+PC') \quad (6)$$

$$Gsf = K/(1+PC') \quad (7)$$

It is apparent from these equations (6) and (7), that the following equation (8) exists between the road information sensitivity Gds and the steering feel Gsf.

$$Gds = Gsf \cdot P(1+Q) \quad (8)$$

In this stage, K represents a rigidity of the torsion bar, and P represents a target to be controlled, so it is preferable that the road information sensitivity Gds and the steering feel Gsf are made desired characteristics by adjusting the controller C' and the filter Q of SAT, in a design of the control system. As a procedure of the design, at first, the controller C' is adjusted to make the steering feel Gsf become a desired characteristic, and the filter Q of SAT is adjusted to make the road information sensitivity Gds become a desired characteristic. However, unless the system has the SAT estimation function 620 and the SAT filter 621 (i.e. Q=0), only the controller C' should be adjusted to make the road information sensitivity Gds and the steering feel Gsf become desired characteristics, because a two-dimensional flexibility control system can not be established. Therefore, it is difficult to establish a control system in which characteristics of both the road information sensitivity Gds and the steering feel Gsf are desired simultaneously.

On the other hand, according to the invention, it may be easy to design a control system in which such two evaluate functions are filled, by tuning, at first, the controller C' including the torque filter 614 to the torque signal Tr so as to establish a desired transmission characteristic of the steering feel Gsf, and by tuning, next, the SAT filter 621 (Q) so as to establish a desired transmission characteristic of the road information sensitivity. In other words, a two-dimensional flexibility control system can be established in such design procedure.

Figure 16:
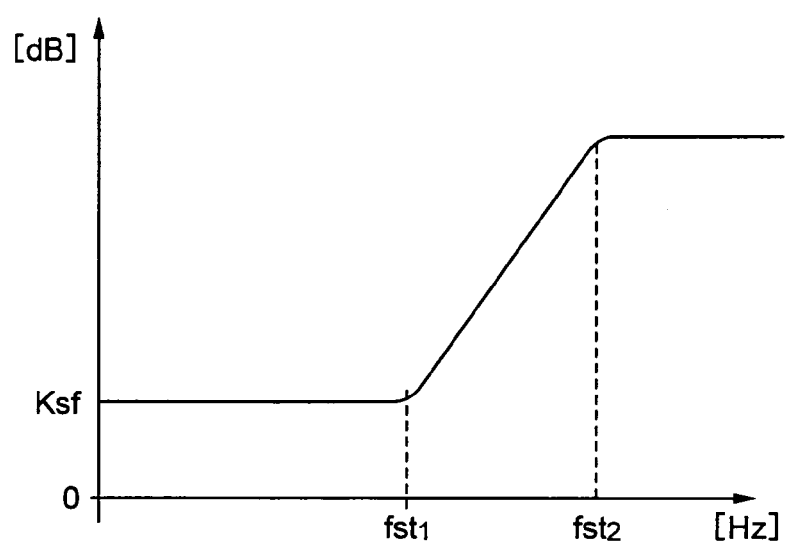
FIG. 16 is a drawing showing a target transmission characteristic of a steering feel.

FIG. 16 shows a target transmission characteristic of the steering feel. A gain Ksf corresponds to a resistant of a steering motion so that the resistant becomes larger (heavier) when the gain Ksf is large and the resistant becomes smaller (lighter) when the gain Ksf is large. The target transmission characteristic may be determined in accordance with a driver's liking. In consideration of a steering follow characteristic, it is an object that the gain is constant in a frequency zone as higher as possible (e.g. fst1 is equal to or more than 5 Hz, and fst2 depends on a vehicle characteristic, a motor characteristic and the like).

Figure 17:
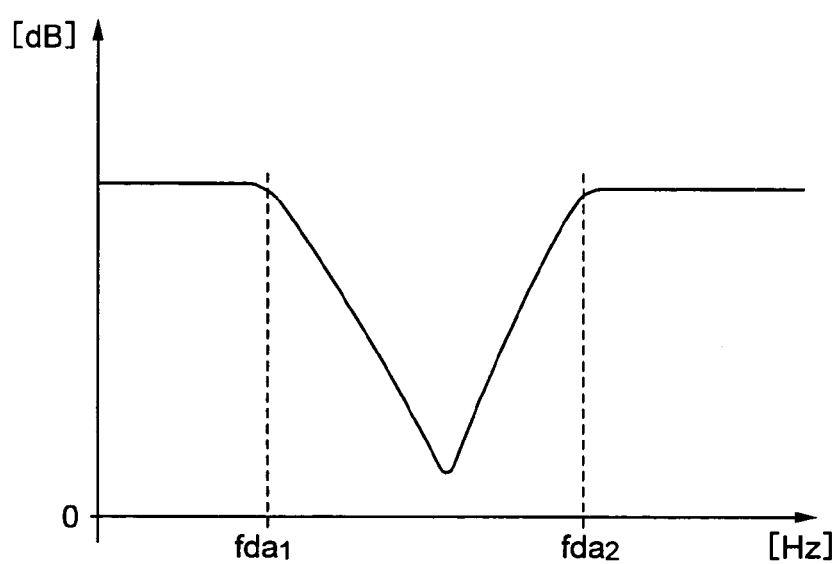
FIG. 17 is a drawing showing a target transmission characteristic of a road information sensitivity.

FIG. 17 shows a target transmission characteristic of the road information sensitivity. The road information is one of important information to a vehicle driver. However, on experience, there is unnecessary road information between 10 Hz to 30 Hz, so it is an object to prevent the road information in such frequency zone from transmitting to the steering wheel. Therefore, it is preferable to design to make a lower limit frequency fda1 become about 10 Hz so on, and to make an upper limit frequency fda2 become about 30 Hz.

By the way, the torque filter 614 and the SAT filter 621 functions as adjusting parameters for a design of the control system, and it is thought that characteristics necessary to the torque filter 614 and the SAT filter 621 may be changed in accordance with a vehicle characteristic, characteristics of other control elements and the like. Therefore, it is said that characteristics necessary to the torque filter 614 and the SAT filter 621 are the follow characteristic shown in FIG. 16 and the characteristic necessary in order to establish the road sensitivity characteristic shown in FIG. 17. In other words, the torque filter 614 to the torque signal Tr is used to improve a follow characteristic of a motor-operated power steering device, and the follow characteristic is established by adjusting the characteristic of the torque filter 614 to the torque signal Tr included in the controller C' in the equation (5). In addition, the SAT filter 621 is used to adjust a characteristic of a road information characteristic, and the characteristic of the road sensitivity shown in FIG. 17 is established by adjusting the characteristic of the SAT filter 621.

According to a motor-operated power steering device of the invention, includes a two-dimensional flexibility system comprises a torque filter processing a torque signal, a SAT estimation function, and a SAT filter processing a SAT information in a frequency zone. Therefore, a steering feel and a road information sensitivity can be designed independently to each other. As the result thereof, it is easy to a control system in which an ideal road information sensitivity and an ideal steering feel are filled simultaneously.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor-operated power steering device, comprising:
   a ball screw mechanism having a ball screw nut and a ball screw shaft connected to a steering mechanism;
   a steering shaft to which a steering force is inputted;

a torque sensor for detecting a steering torque generated on said steering shaft;

a motor for generating a steering assist power on the basis of a signal from said torque sensor, said steering assist power being transmitted through said ball screw mechanism to said steering mechanism; and an elastic member disposed at a support portion of said ball screw nut, an elastic portion of said elastic member being elastically deformable in an axial direction to absorb a received impact.

2. A motor-operated power steering device according to claim 1, wherein said device comprising;

controlling means for controlling said motor on the basis of a steering assist order value calculated at calculating means based upon said steering torque generated on said steering shaft, and upon an electric current control value calculated based upon an electric current value of said motor; and assist calculating means for differentiating said signal of said steering torque and adding it to said steering assist order value.

3. A motor-operated power steering device according to claim 1, wherein said motor is controlled on the basis of a steering assist order value calculated based upon said steering torque generated on said steering shaft, and upon an electric current detected value of said motor providing a steering assist power to said steering mechanism; said device comprising;

a torque filter processing a torque signal, a SELF ALIGNING TORQUE estimation functional section, and a SELF ALIGNING TORQUE filter processing a SELF ALIGNING TORQUE information form said SELF ALIGNING TORQUE estimation functional section, wherein a steering feeling and a frequency characteristic of a road information sensitivity are designed independently to each other, in a two-dimensional flexibility control system.

4. A motor-operated power steering device according to claim 3, wherein a gain of said steering feeling can be designed to maintain a constant value to a frequency as higher as possible.

5. A motor-operated power steering device according to claim 3, eliminating information a frequency zone in which said road in from said road information sensitivity is not necessary.

6. A motor-operated power steering device according to claim 5, wherein said frequency zone is 10 Hz to 30 Hz.

7. An electrically driven power steering apparatus comprising:

a housing;

a ball screw shaft extending within said housing and connected to a steering mechanism;

an input shaft to which a steering force is inputted;

an output shaft for receiving the steering force from said input shaft and outputting the steering force to said ball screw shaft;

a torque sensor for detecting a torque transferred between said input shaft and said output shaft;

a motor including a rotor; and a ball screw nut for giving a force acting in an axial direction to said ball screw shaft by receiving a rotational force from said motor, wherein an elastic portion of an elastic member, elastically deformable in an axial direction to absorb a received impact, is disposed on a support portion of said ball screw nut.

8. An electrically driven power steering apparatus according to claim 7, wherein said elastic member is disposed between said housing and a bearing for supporting said ball screw nut so as to be rotatable with respect to said housing or between said bearing and said ball screw nut.

* * * * *

UNITED STATES PATENT AND TRADEMARK OFFICE
CERTIFICATE OF CORRECTION

| | | |
|---|---|---|
| PATENT NO. | : 7,219,761 B2 | Page 1 of 1 |
| APPLICATION NO. | : 10/804836 | |
| DATED | : May 22, 2007 | |
| INVENTOR(S) | : Toshihiro Fukuda et al. | |

It is certified that error appears in the above-identified patent and that said Letters Patent is hereby corrected as shown below:

On the cover page:

On the cover page, section (30) Foreign Application Priority Data, line 3, "2000-272830" should be --2002-272830--.

Signed and Sealed this

Sixteenth Day of October, 2007

JON W. DUDAS
*Director of the United States Patent and Trademark Office*